United States Patent
Carpio et al.

(10) Patent No.: US 8,452,772 B1
(45) Date of Patent: May 28, 2013

(54) METHODS, SYSTEMS, AND ARTICLES OF MANUFACTURE FOR ADDRESSING POPULAR TOPICS IN A SOCIALS SPHERE

(75) Inventors: Aliza D. Carpio, San Diego, CA (US);
Alan F. Buhler, Encinitas, CA (US);
Joseph P. Elwell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/195,830

(22) Filed: Aug. 1, 2011

(51) Int. Cl.
*G06F 17/30* (2006.01)

(52) U.S. Cl.
USPC .............................. 707/737; 707/738; 707/739

(58) Field of Classification Search
USPC ........ 707/737, 739–741; 706/46, 55; 705/319
See application file for complete search history.

(56) References Cited

U.S. PATENT DOCUMENTS

| | | | | |
|---|---|---|---|---|
| 2009/0018996 A1* | 1/2009 | Hunt et al. | | 707/2 |
| 2010/0145771 A1* | 6/2010 | Fligler et al. | | 705/10 |
| 2010/0205541 A1* | 8/2010 | Rapaport et al. | | 715/753 |
| 2010/0211863 A1* | 8/2010 | Jones et al. | | 715/224 |
| 2010/0262550 A1* | 10/2010 | Burritt et al. | | 705/319 |
| 2011/0010370 A1* | 1/2011 | Cosgrove | | 707/748 |
| 2011/0093361 A1* | 4/2011 | Morales | | 705/26.62 |
| 2011/0191417 A1* | 8/2011 | Rathod | | 709/204 |
| 2011/0218946 A1* | 9/2011 | Stern et al. | | 706/12 |
| 2011/0231416 A1* | 9/2011 | Goodchild | | 707/754 |
| 2011/0307397 A1* | 12/2011 | Benmbarek | | 705/319 |
| 2012/0030018 A1* | 2/2012 | Passmore et al. | | 705/14.52 |
| 2012/0036080 A1* | 2/2012 | Singer et al. | | 705/319 |
| 2012/0066309 A1* | 3/2012 | Yuki et al. | | 709/204 |
| 2012/0158620 A1* | 6/2012 | Paquet et al. | | 706/12 |
| 2012/0209920 A1* | 8/2012 | Neystadt et al. | | 709/205 |

* cited by examiner

*Primary Examiner* — Hanh Thai
(74) *Attorney, Agent, or Firm* — Vista IP Law Group LLP

(57) ABSTRACT

Disclosed are methods, systems, and articles of manufactures for addressing popular topics in a social sphere. The method or the system continuously monitors conversations in online forum(s), identifies trend(s) of interest, identifies one or more content items that match the trend(s), and delivers the one or more content items to appropriate forum(s). The method or the system may aggregates conversations in a target forum to identify a trend and automatically responds to the trend by identifying and delivering matching existing content items to a target forum. The method or the system may further catalog a newly created content item upon creation and may identify a trend by employing some third-party products or services, by executing one or more Internet bots to monitor the online conversions, or by using trending application(s) offered by forums or social network websites.

42 Claims, 14 Drawing Sheets

METHODS, SYSTEMS, AND ARTICLES OF MANUFACTURE FOR ADDRESSING POPULAR TOPICS IN A SOCIALS SPHERE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As social networking continues to gain popularity, the functions of social network websites have evolved from connecting maintaining social relations among individuals to providing more business oriented functions such as providing discussion forums for a group of individuals or organizations sharing some common interests in or issues with products or services. Nonetheless, due to the nature of the social networks being started with social relations and thus the unique characteristics of social network websites, much of the dialog and conversations go unheard or unanswered by some real parties in interest even though a lot of dialog and conversations happen naturally in the social sphere. For example, certain online platforms or social network websites may contain a lot of conversations and responses about a particular issue of a particular product or service offered by a company. Nonetheless, the company's representatives may not even be aware of such conversations and responses and thereby miss the opportunity to improve their product or service, to maintain good customer relationship, or to keep up the goodwill or reputation of the company. On the other hand, it is not only impractical but almost impossible to have human representatives to listen in every online platform to identify such conversations or responses unless these human representatives so happen to be connected to individuals or organizations that voice their opinions in the social sphere—a highly unlikely situation. Furthermore, even if these human representatives were to be connected to the right individuals or organizations, it is also unlikely for these representatives to provide seasonable responses to address these issues in the conversations. Therefore, there is a need for a method and a system for address popular topics in a social sphere.

SUMMARY

Disclosed are various embodiments of methods, systems, and articles of manufactures for addressing popular topics in a social sphere. In some embodiments, the method or the system continuously monitors the conversations in one or more online forums (e.g., social network website(s)), identifies one or more trends of interest, identifies one or more content items that match each of the one or more trends, and delivers the one or more content items to appropriate forums. In some embodiments, the method or the system for addressing popular topics in a social sphere aggregates the trends in a social sphere and automatically responds to the trends by identifying matching existing content items and delivering the matching content items to a target forum for which the trends are identified. The method or the system may further catalog a newly created content item as the newly created content item is created. The method or the system may identify a trend either by employing some third-party products or services or by employing one or more Internet bots to monitor the online conversions to identify the trend or by using some trending applications offered by certain forums or social network websites.

In some embodiments, the method or the system may comprise the respective process or hardware module to identify a pertinent trend in conversations of a target forum and then to identify or create one or more cataloged content items that match the pertinent trend. The method or the system may further comprise the respective process or hardware module to identify or create a presentation requirement for the one or more cataloged content items and deliver at least some of the one or more cataloged content items to the target forum based at least in part upon the presentation requirement.

In some embodiments where one or more external sources provide one or more trends with sufficient information for the method or the system to understand the meaning(s) or issue(s) of the one or more trends, the method or the system may further comprise the respective process or hardware module to identify or receive one or more trends from the one or more external sources, to determine the pertinent trend from the one or more trends by performing a trend filtering process, and to determine the meaning(s) or the issue(s) of the pertinent trend by performing a process. In some embodiments, the process or hardware may further comprise the respective process or hardware module to perform a lexical analysis, to perform a syntax analysis, to perform a semantics, and to perform a context analysis to determine the meaning(s) or issue(s) associated with the pertinent trend. In some embodiments, the method or the system may further comprise the process or hardware module to perform a natural language processing to determine the meaning(s) or issue(s) associated with the pertinent trend. In some of these embodiments, the natural language processing may comprise the actions to perform a natural language understanding, to perform a natural language word sense process, to recognize one or more recognized terms, to perform segmentation, and to identify one or more relationships between a first portion and a second portion of the pertinent trend.

In some embodiments where one or more external sources provide one or more trends without sufficient information but includes additional information from other pages or sources for the method or the system to understand the meaning(s) or issue(s) of the one or more trends, the method or the system may further comprise the respective process or hardware module to identify or receive one or more trends from the one or more external sources, to aggregate additional information or data associated with the one or more trends, and to determine the meaning(s) or issue(s) associated with the one or more trends based at least in part upon the additional information or data. In some embodiments, the method or the system may further comprise the respective process or hardware module to filter the one or more trends to determine a pertinent trend, and to filter the additional information or data associated with the one or more trends to determine pertinent information or data associated with the pertinent trend in order to identify the pertinent trend in the conversations in a target forum. In some embodiments, the method or the system may further comprise the respective process or hardware module to filter the one or more trends to determine a pertinent trend, and to filter the additional information or data associated with the one or more trends to determine the pertinent information or data associated with the pertinent trend in order to identify the pertinent trend. In some embodiments, the method or the system may further comprise the respective process or hardware module to determine the meaning(s) or issue(s) based at least in part upon the pertinent trend or the pertinent information or data associated with the pertinent trend in order to identify the pertinent trend in the conversations. In some embodiments, the method or the system may further comprise the respective process or hardware module to perform a data dredging process on the one or more trends to filter the one or more trends, and to perform the data dredging process on the additional information or data associated with the one or more trends to filter the one or more trends.

In some embodiments where the method or the system does not identify a trend from external sources, the method or the system may further comprise the respective process or hardware module to monitoring conversations in a social sphere, to aggregate the conversations to create a target data set, to perform a natural language processing on the target data set, and to identify a pertinent trend based at least in part upon a result of the natural language processing in order to identify the pertinent trend in the conversations of the target forum. In some embodiments, the method or the system may further comprise the respective process or hardware module to validate the target data set by using one or more test cases, to adjust the action of aggregating the conversations based at least in part upon a result of validating the target data set, and to determine a meaning of or an issue associated with the pertinent trend. In some embodiments, the method or the system may further comprise the respective process or hardware module to use a program that browses at least a part of the target forum in an automated manner and is designed with reference to a robots exclusion standard associated with the target forum in order to monitor the conversations. In some embodiments, the method or the system may further comprise the respective process or hardware module to perform a content management process on a plurality of existing content items, to classify or clustering the plurality of existing content items to identify one or more classifications for an existing content item of the plurality of existing content items, to identify or determining one or more relationships between the existing content item and a product or service, and to match the pertinent trend with one or more existing content items of the plurality of existing content items in order to identify or create one or more cataloged content items that match the pertinent trend. In some embodiments, the content management process may comprise the respective process or hardware module to capture one or more content items to form the plurality of existing content items, to recognize one or more objects of interest of the existing content item, to process the existing content item to clean up the content item, to unify related data or information that are related to the existing content item by at least aggregating the related data or information from one or more sources of data or information, to index the existing content item by associating one or more indices with the existing content item, or to transform the existing content item from a first format to a second format. In some embodiments, the method or the system may further comprise the respective process or hardware module to analyze a format of and a language used in the existing content item, to perform natural language processing on the existing content item, to parse the existing content item to determining a parsing result for the existing content item, and to perform the action of indexing the existing content item based at least in part upon the parsing result in order to index the existing content items. In some embodiments, the method or the system may further comprise the respective process or hardware module to provide vocabulary support by using a set of lexemes, to describe the at least the part of the existing content item by using one or more syntaxes, one or more principles, or rules determined from a syntax analysis, to determine or identifying semantic information or meanings for the at least the part of the existing content item by using generative or interpretative semantics, and to determine or identify an understanding of the at least the part of the at least the part of the existing content item by using one or more grammars in order to parse the existing content item. In some embodiments, the method or the system may further comprise the respective process or hardware module to perform natural language processing on the at least the part of the existing content item in order to parse the at least a part of the conversation.

In some embodiments, the method or the system may further comprise the respective process or hardware module to receive additional information or data that are related to the at least some of the one or more content items from a separate computing system or a separate site, and to deliver the at least some of the one or more content items to the separate computing system or the separate site. In some embodiments, the method or the system may further comprise the respective process or hardware module to classify the order in the aggregated representation among a plurality of orders by using the addition information or data received from the remote computing system, in which the additional information or data or the data on the remote computing system comprise at least one of personal finance data, tax data, budgeting data, order receipt data, accounting data, or tax return data.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF ILLUSTRATED EMBODIMENTS

Figure 1:
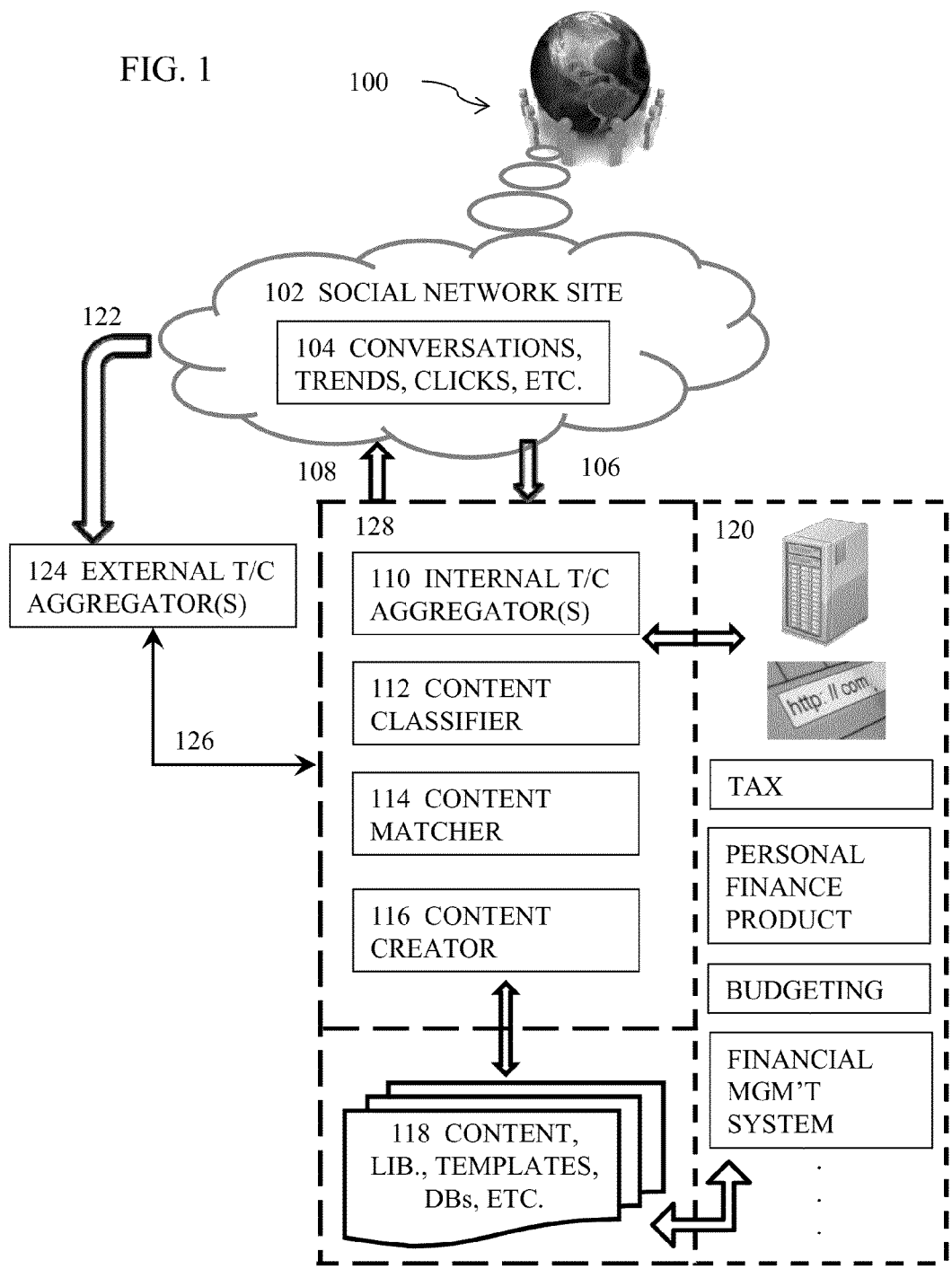
FIG. 1 illustrates an exemplary schematic diagram of one or more application servers that execute various modules or processes and interact with a social sphere for addressing popular topics in some embodiments.

Various embodiments are directed to a method, system, and computer program product for analyzing behavior of Internet forum participants. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of embodiments can be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration.

Various embodiments are directed at methods, systems, and articles of manufactures for addressing popular topics in a social sphere. In some embodiments, the method or the system employs one or more computing systems to identify one or more trends in a social sphere from one or more external products or services (e.g., a third-party trending program or a third-party online trending service). The method or the system may then analyze the one or more trends to determine some pertinent trends that are related to a product or service of interest and search for one or more content items that may be used to address these pertinent trends. In some embodiments, the matching content items have been previously categorized or classified together with other content items by the method or the system. In some embodiments where no matching content items may be found, the method or the system may further cause one or more content items that may be used to address the pertinent trends to be generated. The method or the system may then deliver a form of at least one of the matching content item to a target forum or target audience to address the pertinent trends.

In some embodiments, the method or the system employs one or more computing system to monitor various conversations, discussions, posts, tweets, etc. (hereinafter conversation or conversations) in a social sphere, aggregate the relevant conversations into a target data set, and analyze the aggregated target data set to determine one or more trends or popular topics that are related to a product or service. The method or the system may then search for one or more content items that may be used to address the one or more trends or popular topics. In some embodiments, the matching content items have been previously categorized or classified together with other content items by the method or the system. In some embodiments where no matching content items may be found, the method or the system may further cause one or more content items that may be used to address the one or more trends or popular topics to be generated. The method or the system may then deliver a form of at least one of the matching content item to a target forum or target audience to address the pertinent trends. More details about various processes or modules to implement various embodiments are further described below with reference to FIGS. 1-14.

FIG. 1 illustrates an exemplary schematic diagram of one or more application servers that execute various modules or processes and interact with a social sphere for addressing popular topics in some embodiments. More specifically, FIG. 1 illustrates a social sphere 100 which includes a plurality of individuals, organizations, or a combination thereof and is organized by one or more social network sites 102, each of which provides a platform for a set of the individuals, organizations, or a combination thereof to initiate or participate in some forms of conversations, posts, tweets, podcasts, messages, clicks, trends, searched items, etc. 104 (hereinafter conversation or conversations.) In some embodiments, a social sphere 100 may correspond to or may be associated with one or more social network websites, one or more blogs, one or more search engines, one or more online communities, one or more forums, etc. and will be collectively referred to as a social network site or a forum in this disclosure. One or more computing systems 120 or 128 may interact with the one or more social network sites 102 via one or more connections 108 to send to and 106 to receive from the one or more social network sites 102. The one or more computing systems 120 may provide products or services such as but not limited to tax products or services (e.g., Turbo Tax® offered by Intuit, Inc.), personal finance management product(s) or service(s) (e.g., Mint.com or Quicken® offered by Intuit, Inc.), budgeting product(s) or service(s) (e.g., Mint.com or Quicken® offered by Intuit, Inc.), or financial management system of product(s) or service(s) (e.g., Quicken®, Quickbooks®, Intuit Online Payroll, GoPayment, etc. offered by Intuit, Inc.) The one or more computing system 128 may comprise an internal trend or conversation aggregator(s) process or module 110, a content item classifier 112, a content matcher 114, or a content creator 116. It shall be noted that the various processes may be run on one or more computing systems, and various modules may be executed on one or more computing systems. Therefore, the one or more computing systems 128 and 120 may comprise a single computing system encompassing all the processes or modules or may comprise multiple computing systems, each of which is responsible for some but not all the processes or modules. The one or more computing systems 120 and 128 interact with and thus read from and write to one or more persistent storage devices 118, which may store thereupon, for example, various data, various libraries for the execution of various processes or functions described herein, one or more content items, one or more templates, one or more data structures (e.g., relational or non-relational databases), etc. in some embodiments. The system may also comprise or interact with one or more forms of temporary storage such as some random access memory to temporarily store various data, variable or parameter values, objects, or other information required or need for the execution of various processes or modules described herein or processes or modules required or needed to support the execution of various processes or modules described herein. The one or more persistent storage devices 118 may be implemented in separate storage units such as any non-volatile computer readable, non-transitory storage media. In some embodiments, the one or more persistent storage devices 118 may be implemented in a single storage unit.

One or more external trends or conversation aggregators 124 may also interact with the one or more social network sites 102 to identify one or more trends from the conversations 104. The one or more systems 128 may interact with the one or more external trends or conversation aggregators 124 to send inquiries to and retrieve results (e.g., one or more trends associated with a product or service) from the one or more external aggregators 124.

Figure 2:
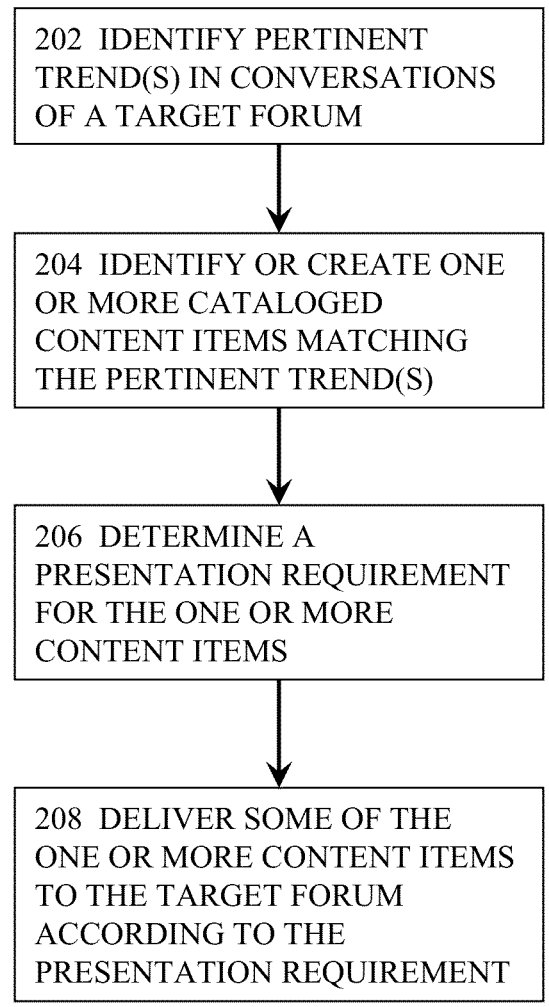
FIG. 2 illustrates a top level flow diagram for addressing popular topics in a social sphere in some embodiments.

FIG. 2 illustrates a top level flow diagram for addressing popular topics in a social sphere in some embodiments. In some embodiments, the method or the system for addressing popular topics in a social sphere may comprise the respective process or module 202 to identify one or more pertinent trends in conversations of a target forum. In some embodiments, a trend comprises a general course, tendency, or drift of opinions, issues, problems, concerns, questions, or interests of users in a social sphere. In some embodiments, the terms "trend" and "popular topic" may be used interchangeably. The method or the system may identify the one or more pertinent trends either by using some external sources (e.g., a third-party trend aggregator) or by performing some internal processes or executing some internal modules. In some embodiments, the method or the system may further comprise the respective process or module 204 to identify or create one or more content items that match the one or more pertinent trends. In some embodiments, a content item may comprise, for example but not limited to, frequently asked questions (FAQs), online or offline help files, white papers, internal or external reports, journal articles, prior posts in various forums or sites, etc. (collectively content items or a content item) and may comprise the formats of text, graphics, audio, video, or any combinations thereof. In some embodiments, content items are stored on some forms of persistent storage media with or without conversion or transformation. In some embodiments, existing content items may be categorized or classified based on one or more criteria. In some embodiments, the method or the system may further comprise the respective process or module 206 to determine a presentation requirement for the one or more content items that match the pertinent trends identified at 202.

For example, the method or the system may comprise one or more instances of a process—MonitorService—that continuously monitors the conversations in various forums in some embodiments. The MonitorService may also monitor the conversations while employing the services of a third-party trending application or service or the services of the forums (e.g., Google Trends, Twitter Search, etc.) The method or the system may further comprise a cataloging process or module, CatalogService, to catalog existing content items or a newly generated content item when the newly generated content item is created. The following section includes some exemplary pseudo code to perform these functions.

String trendingTopic (from MonitorService);
    Article newArticle;
    If (CatalogService.exists(trendingTopic))
    {
      newArticle=CreateArticle(CatalogService.get(trendingTopic))
    }
    If (newArticle.templater(TwitterFormat) !=null)
    Twitter.post(newArticle.templater(TwitterFormat));
    If (newArticle.templater(FaceBookFormat) !=null)
    Facebook.post(faceBookFormat. templater(FaceBookFormat));
    If (newArticle.templater(blogFormat) !=null)
    IntuitBlog.post(newArticle. templater(blogFormat));
    If (newArticle.templater(EmergingTechFormat) !=null)
    EmergingTechFormat.post(newArticle. templater(EmergingTechFormat));
    Function CreateArticle(content)
    {
      Foreach template in contentAwareTemplates
      {
        This.article.templater(template.type)=template.apply(content);
      }
    Return this.article;
    }
    Function template::apply(content)

Note that the "exist" function may trigger a search of a catalog or database of any content items that matches the passed-in string for a trend or popular topic. The CreateArticle function may generate content item(s) specific to each known format (e.g., a Facebook, Twitter, and Blog format in the above exemplary pseudocode.) Each specific version content item may then be delivered to the appropriate forum. The CatalogService categorizes or classifies a content item as the content item is created.

A presentation requirement may comprise one or more requirements imposed by a target forum on the, for example but not limited to, language used or permitted, display page(s) layout requirement(s), protocol or standard compliance requirement(s), one or more presentation templates, rendering requirements (e.g., whether graphic elements are permitted in the representation, whether multimedia objects are permitted in the representation, whether frames or Server Side Includes (SSIs) are permitted, etc.), or limit(s) on character length, etc. in some embodiments.

For example, the language used or permitted requirement may comprise, for example but not limited to, HTML (hypertext markup language), SHTML (server side includes enabled HTML), XML (extensible markup language), XHTML (extensible hypertext markup language), SGML (standard generalized markup language), SMS (short messaging service), MMS (multimedia messaging service), secure messages, or any other suitable languages, etc. The layout requirement of the display page may comprise one or more requirements on, for example but not limited to, locations and areas that may be allocated for the representation or may be reserved for other purposes, or whether certain specific data types are permitted (e.g., whether the representation may include email address(es) or uniform resource locator(s).) The protocol or standard compliance requirement may comprise, for example but not limited to, SMTP (Simple Mail Transfer Protocol), ESMPT (Extended Simple Mail Transfer Protocol), SMTPS (SMTP secured by Secure Sockets Layer), POP (Post Office Protocol), IMAP (Internet Message Access Protocol), or other Internet standard for electronic mails, IPv6 (Internet Protocol version 6), IPv4 (Internet Protocol version 4, or other protocols for data packet transmissions, character encoding or character set requirement (e.g., ASCII, Extended Binary Coded Decimal Interchange Code, or various ISO character encodings, or any other requirement imposed on the representation.

Figure 3:
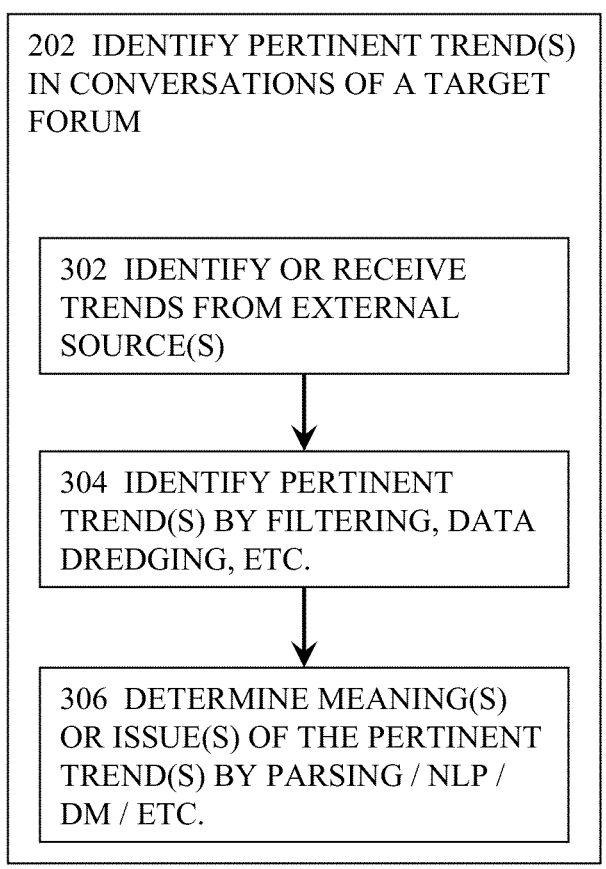
FIG. 3 illustrates more details for a part of the top level flow diagram illustrated in FIG. 2 in some embodiments.

FIG. 3 illustrates more details for a part of the top level flow diagram illustrated in FIG. 2 in some embodiments. More specifically, FIG. 3 illustrates more details about the process or module 202 to identify a pertinent trend in conversations of a target forum in some embodiments. In these embodiments, the process or module 202 to identify a pertinent trend may comprise the respective process or module 302 to identify or receive one or more trends from one or more external sources. In some embodiments, the one or more external sources may comprise a third-party trending software program or services such as Google Trends, Google Checkout Trends, the former Google Zeitgeist, Facebook Lexicon or Facebook Memology, Twitter APIs (application programming interfaces) such as Twitter Search or Tweeting Trends, Trendpedia offered by trendpedia.com, or some web-based applications such as hashtags.org. In these embodiments, the process or module 202 to identify a pertinent trend may comprise the respective process or module 304 to identify a pertinent trend from the one or more trends identified or received at 302. In some embodiments, the process or module 302 identifies a pertinent trend from the one or more trends identified or received from one or more external sources by performing a filtering process to filter out irrelevant trend(s) based on, for example, some filtering rule(s) or keyword search against a plurality of keywords (e.g., "Turbo Tax", "Quicken", etc.) that are stored in one or more data structures such as one or more relational or non-relational databases or one or more tables. In some embodiments, the process or module 302 identifies the pertinent trend from the one or more trends by performing a data dredging process that uses some data mining techniques to uncover misleading relationships or statically insignificant relationships in the one or more trends identified or received from the one or more external sources. In some embodiments, the process or module 202 to identify a pertinent trend may comprise the respective process or module 306 to determining the meaning or issue(s) from the pertinent trend. In some embodiments, the process or module 306 determines the meaning or issue(s) by parsing the pertinent trend and analyzing the parsing result (e.g., a parse tree). In some embodiments, the process or module 306 determines the meaning or issue(s) by performing a data mining process. In some embodiments, the process or module 306 determines the meaning or issue(s) by performing a natural language processing on the pertinent trend. In some embodiments, the process or module 202 illustrated in FIG. 3 comprises the scenario where the one or more trends identified or received from the one or more external sources include sufficiently detailed information indicating, for example, what product(s) or services the one or more trends are directed at, what the issue(s) or the meaning of the one or more trends tell or imply, etc. so the process or module 202 needs not perform further actions (e.g., to browse through, for example, the embedded URLs (uniform resource locations) associated with the one or more trends to further examine what the one or more trends are referring to.

Figure 4:
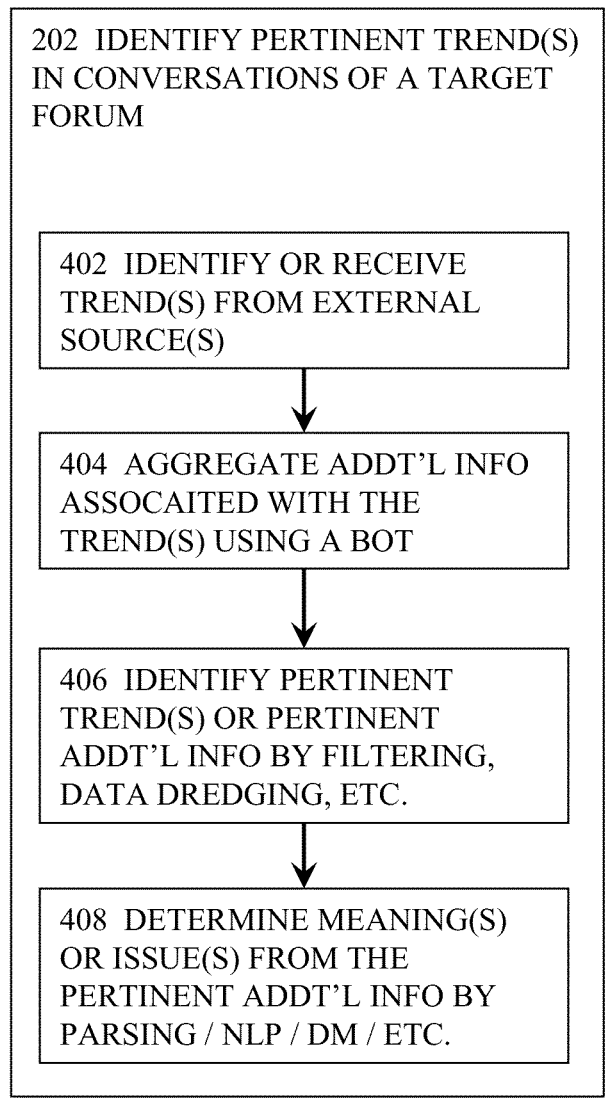
FIG. 4 illustrates more details for a part of the top level flow diagram illustrated in FIG. 2 in some embodiments.

FIG. 4 illustrates more details for a part of the top level flow diagram illustrated in FIG. 2 in some embodiments. More specifically, FIG. 4 illustrates more details about the process or module 202 to identify a pertinent trend in conversations of a target forum in some embodiments. In these embodiments, the process or module 202 to identify a pertinent trend may comprise the respective process or module 402 to identify or receive one or more trends from one or more external sources. In some embodiments, the process or module 202 may further comprise the respective process or module 404 to aggregate additional information that is associated with the one or more trends. In some embodiments, the process or module 404 is to aggregate the additional information associated with the identified or received one or more trends by using, for example but not limited to, one or more Internet bots or one or more programs that imitate a human being's actions to browse through the URLs or links that are embedded on the same or different page(s) on which the one or more trends are identified or received. For example, the one or more trends identified or received from the one or more external sources may be included or listed on a web page, and each of the one or more trends may comprise an embedded URL, which, when clicked upon, brings up more details about that specific trend. In this example, the process or module 402 may invoke or execute an Internet bot or another program to crawl the various web pages or to imitate a human being's actions to browse through such various web pages to further aggregate the additional information from the embedded URLs or links. In some embodiments, the process or module 202 may further comprise the respective process or module 406 to identify one or more pertinent trends from the one or more trends identified or received from the one or more external sources. In some embodiments, the process or module 202 may further comprise the respective process or module 404 to identify the pertinent, additional information associated with the one or more pertinent trends. In some embodiments, the process or module 202 may first identify the one or more pertinent trends from the one or more identified or received trends from the one or more remote resources and then identify the pertinent, additional information for the one or more pertinent trends. In some embodiments, the process or module 202 may further comprise the respective process or module 408 to determine the meaning(s) or issue(s) associated with each of the pertinent trend by using the additional, pertinent information. In some embodiments, the process or module 202 illustrated in FIG. 4 comprises the scenario where the one or more trends identified or received from the one or more external sources does not include sufficiently detailed information to indicating, for example, what product(s) or services the one or more trends are directed at, what the issue(s) or the meaning of the one or more trends tell or imply, etc. so the process or module 202 needs to perform further actions (e.g., to browse through, for example, the embedded URLs (uniform resource locations) associated with the one or more trends to aggregate additional information so as to further examine what the one or more trends are referring to.

Figure 5:
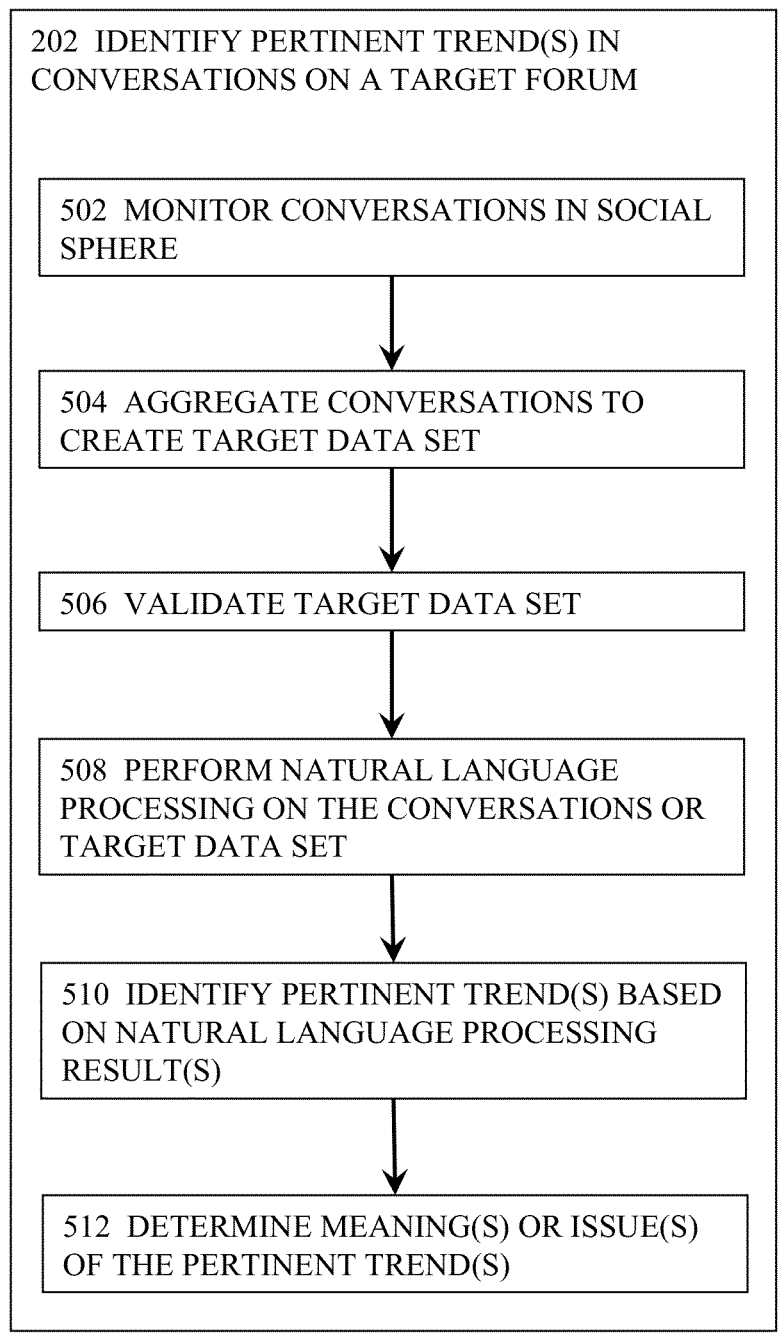
FIG. 5 illustrates more details for a part of the top level flow diagram illustrated in FIG. 2 in some embodiments.

FIG. 5 illustrates more details for a part of the top level flow diagram illustrated in FIG. 2 in some embodiments. In these embodiments, the process or module 202 to identify one or more pertinent trends in conversations on a target forum comprises the respective process or module 502 to monitor conversations in a social sphere or in the target forum. In some embodiments, the process or module 502 may invoke or execute one or more Internet bots or one or more programs to crawl the forum or to execute one or more programs that imitate human being's browsing actions to monitor the conversations. In some embodiments, the process or module 502 may create a community, a thread, or a specific discussion platform within the target forum or the social sphere to create a centralized sub-forum that is dedicated to one or more aspects of a specific product or service. For example, the process or module 502 may create a "Turbo Tax" community in a social network to provide a sub-forum in the social network for users to discuss any issues or topics about Turbo Tax. In some embodiments, the process or module 502 may create one or more websites by using specific words as the label for the newly created domain to provide an additional, specific forum for users to discuss a specific product or service. For example, the process or module may cause a newly created domain with the name "www.turbotaxissues.com" to be registered with a domain name registrar and use, for example, SEO (search engine optimization) techniques to modify the home page, various tags, sitemap, etc. to ensure that the newly created website will be shown among the top few search results in one or more search engines so general users may easily identify this newly created website. In some embodiments, the process or module 502 may create a sub-domain in an existing domain to provide an additional discussion forum for a specific product or service and use, for example, SEO techniques similarly to ensure that the newly created sub-domain will be shown among the top few search results in one or more search engines. In some embodiments, the process or module 202 may further comprise the respective process or module 504 to aggregate conversations to create a target data set by using, for example but not limited to, data mining techniques, natural language processing techniques, information extraction techniques, knowledge discovery techniques, fuzzy string search or matching, or parsing techniques, etc. In some embodiments, the process or module 202 may further comprise the respective process or module 506 to validate the validity or correctness of the target data set created by aggregating the conversations. For example, the process or module 506 may verify the patterns produced by first creating a smaller training dataset from the aggregated conversations and then by applying any of the aforementioned techniques such as data mining techniques, etc. together with an overfitting process in the training dataset to find one or more patterns in the training dataset that are not present in the aggregated conversations. The process or module 506 may then use these one or more patterns that are not present in the aggregated conversations to train the aforementioned techniques such as the data mining techniques etc. in order to improve the accuracy of these techniques and further to use the trained techniques on the aggregated conversations to create the target dataset. In some embodiments, the process or module 202 may further comprise the respective process or module 508 to perform natural language processing on the aggregated conversations or on the target data set to understand the aggregated conversations or the target dataset. In some embodiments, the process or module 202 may further comprise the respective process or module 510 to identify one or more pertinent trends by using at least the result(s) of the natural language processing. In some embodiments, the process or module 202 may further comprise the respective process or module 512 to determine the meaning or issue(s) of the pertinent trend based at least in part upon the result(s) of natural language processing. In some embodiments, the process or module 202 may employ a MonitorService process to continuously monitor the conversations or trends based on, for example, how often one or more specific words or one or more specific tags appear in the conversations by using one or more trending data sources such as Google Trends, etc. described above.

Figure 6:
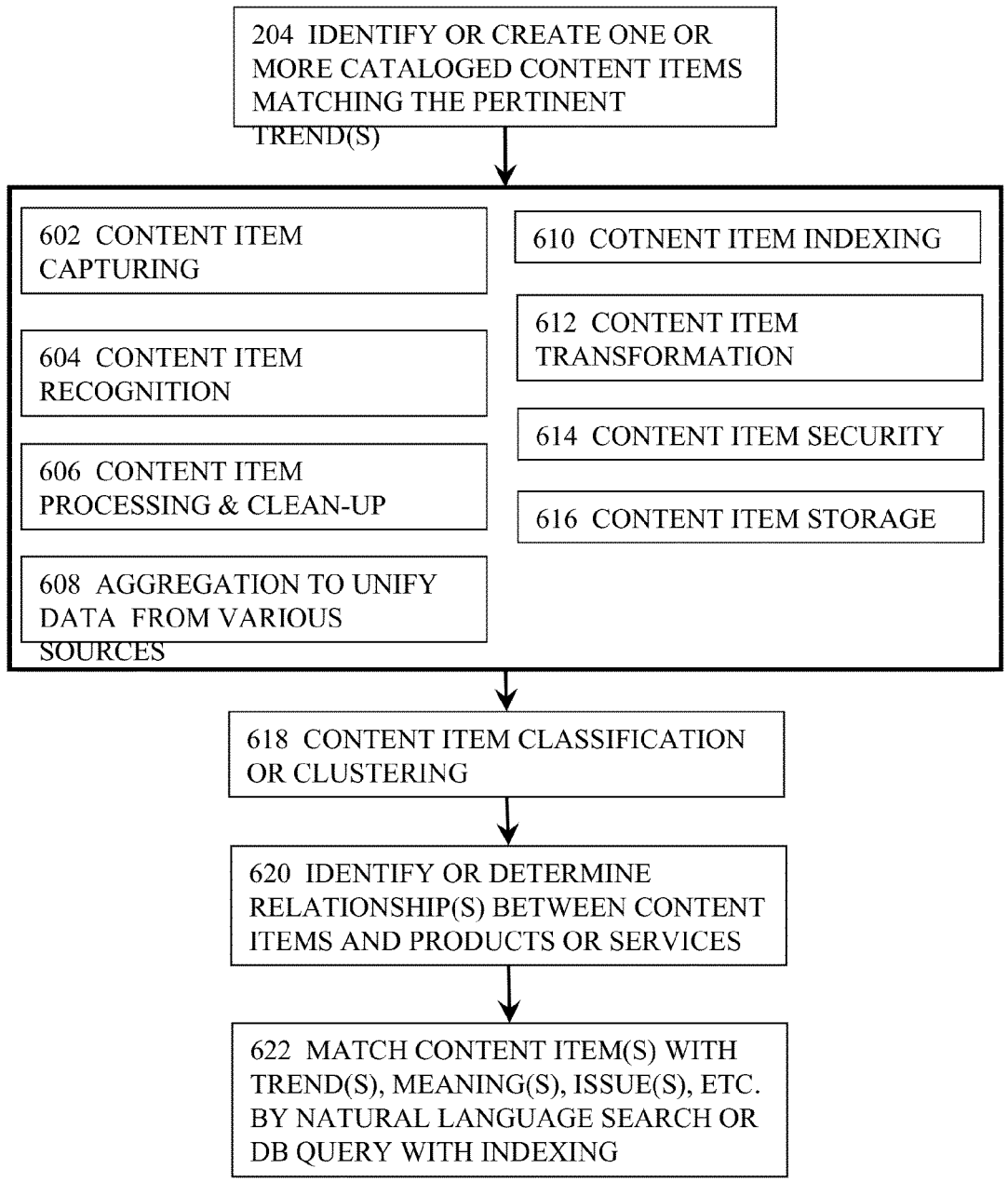
FIG. 6 illustrates more details for a part of the top level flow diagram illustrated in FIG. 2 in some embodiments.

FIG. 6 illustrates more details for a part of the top level flow diagram illustrated in FIG. 2 in some embodiments. More specifically, FIG. 6 illustrates more details about the process or module 204 of identifying or creating one or more cataloged content items that match the pertinent trends by using an indexing process, such as but not limited to, a full-text indexing process or a database indexing process. In some embodiments, the process or module 204 to identify or create one or more cataloged content items may comprise using an indexing process may use the indexing process to build the relationships among words and to determine meanings of one or more terms and may further comprise the respective process or module 602 to capture existing content items. For example, the process or module 602 may examine various storage devices, data structures, etc. to identify one or more content items from these storage devices, data structures, etc. In some embodiments, the process or module 602 may further identify a link, which comprises the directory path information for each of the content items identified. In some embodiments, the process or module 602 may further aggregate the identified content items and store them in a central repository in a form of, for example, a data object in a database while providing a unique identifier for each of the stored content items for subsequent search, identification, or retrieval. In some embodiments, the process or module 202 may further comprise the respective process or module 604 to recognize the identified content items. For example, the process or module 604 may perform various techniques, such as but not limited to, optical character recognition (OCR), handwriting recognition (HCR), intelligent word recognition (IWR), intelligent character recognition (ICR), text-to-speech or speech-to-text conversion, detachment, decryption, object recognition, image alignment or rotation, or any other transformations to recognize the identified content items. In some embodiments, the process or module 202 may further comprise the respective process or module 606 to process and clean-up the identified or recognized content items. For example, the process or module 606 may perform rotation, straightening, color adjustment, zooming, aligning, page separation, annotations, or despeckling on the identified content items. In some embodiments, the process or module 202 may further comprise the respective process or module 608 to aggregate the content items to unify data from various sources. For example, the process or module 608 may combine or link multiple content items, each of which has been recognized and understood to address one or more common issues or topics. In some embodiments, the process or module 608 may further forward the aggregated data items to storage or another processing module in a uniform structure or format. In some embodiments, the process or module 202 may further comprise the respective process or module 610 to index the content items by assigning index attributes to each of the content items with using, for example, input-design profiles that describe a content item classification or limit the number of possible index attributes for the content item. In some embodiments, the indices may be used by various other processes or modules, such as a content classifier 112 that extract the indices to classify the content items autonomously. In some embodiments, the process or module 202 may further comprise the respective process or module 612 to transform one or more content items from one format into one or more other formats suitable for representation of the content item in various forums. In some embodiments, the process or module 202 may further comprise the respective process or module 614 to provide security or access control to the content items by using various techniques, such as but not limited to, digital rights management (DRM) to limit the use of the content items. In some embodiments, the process or module 202 may further comprise the respective process or module 616 to store the content items in various forms such as one or more databases on one or more storage devices. When the content items have been captured, indexed, and stored according to at least some of the processes or modules 602-616 described immediately above, the process or module 202 may further comprise the respective process or module 618 to classify, categorize, or cluster the content items by using, for example, the content classifier 112 of FIG. 1. For example, the process or module 618 may examine a content item against a keyword database, which includes a plurality of keywords and corresponding classes or categories, to determine whether certain keywords are present in the content item and/or against a pattern database, which includes a plurality of recognized patterns or relationships among various words or terms and corresponding classes or categories, to determine whether certain patterns or relationships exist or whether certain relationships exist in the content item. In some embodiments, the process or module 202 may further comprise the respective process or module 620 to identify or determine one or more relationships among content items and products. For example, the process or module 620 may determine the relationship between a content item and a particular product or service by determining whether words, terms, or phrases related to the particular product or service are present in the content item. A content item may thus be corresponding to one or more products or services and may be classified into one or more classes or categories. In some embodiments, the process or module 202 may further comprise the respective process or module 622 to match one or more content items with a pertinent trend or the meaning or the issues of the pertinent trend by performing natural language search or database queries with indexing. In some embodiments where no existing content items may be found to match a pertinent trend or the meaning or issue(s) of the pertinent trend, the process or module 204 may further cause one or more content items to be created by using the CreateArticle function mentioned above that generates content items specific to known formats.

Figure 7:
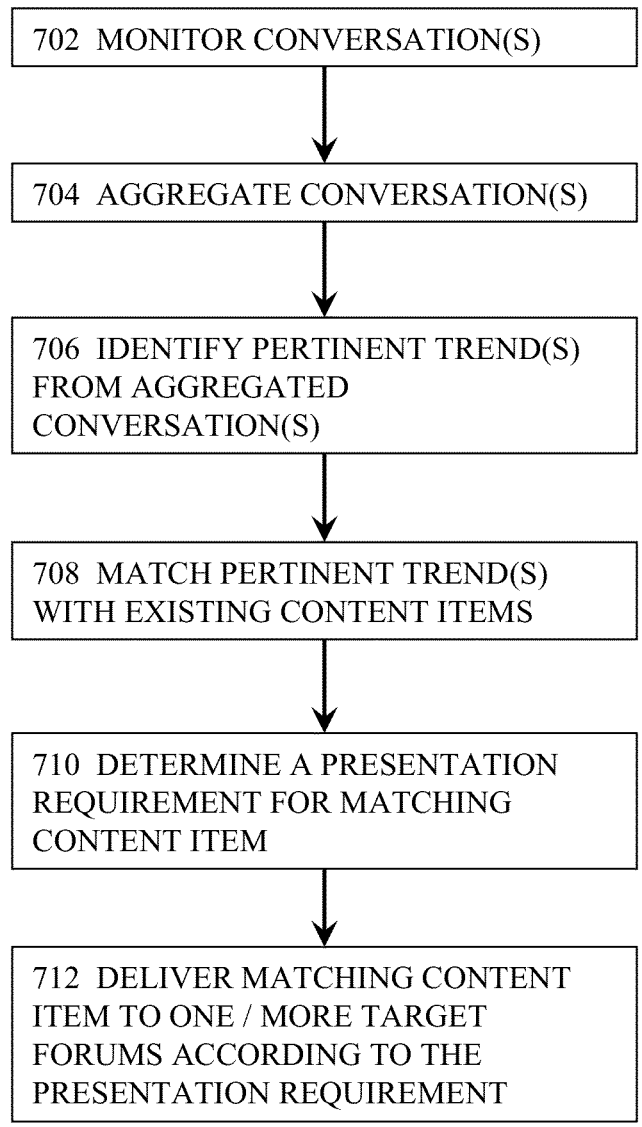
FIG. 7 illustrates more details for a flow diagram for addressing popular topics in a social sphere in some embodiments.

FIG. 7 illustrates more details for a flow diagram for addressing popular topics in a social sphere in some embodiments. In some embodiments, the method or the system for addressing popular topics in a social sphere may comprise the respective process or module 702 to monitor one or more conversations in a social sphere. In these embodiments, the term conversations is used to collectively represent discussions, online conversations, posts, tweets, podcasts, messages, clicks, trends, or searched items, etc. In some embodiments, the method or the system for addressing popular topics may comprise the respective process or module 704 to aggregate one or more conversations that are related to a product or service. In some embodiments, the method or the system for addressing popular topics in a social sphere may comprise the respective process or module 706 to identify or determine one or more pertinent trends from the aggregated one or more conversations. In some embodiments, the method or the system for addressing popular topics in a social sphere may comprise the respective process or module 708 to match each of the identified or determined one or more pertinent trends with one or more content items. In some embodiments, the method or the system for addressing popular topics in a social sphere may comprise the respective process or module 712 to deliver the one or more matching content items for each of the one or more pertinent trends to a target forum based at least upon a presentation requirement associated with the target forum.

Figure 8:
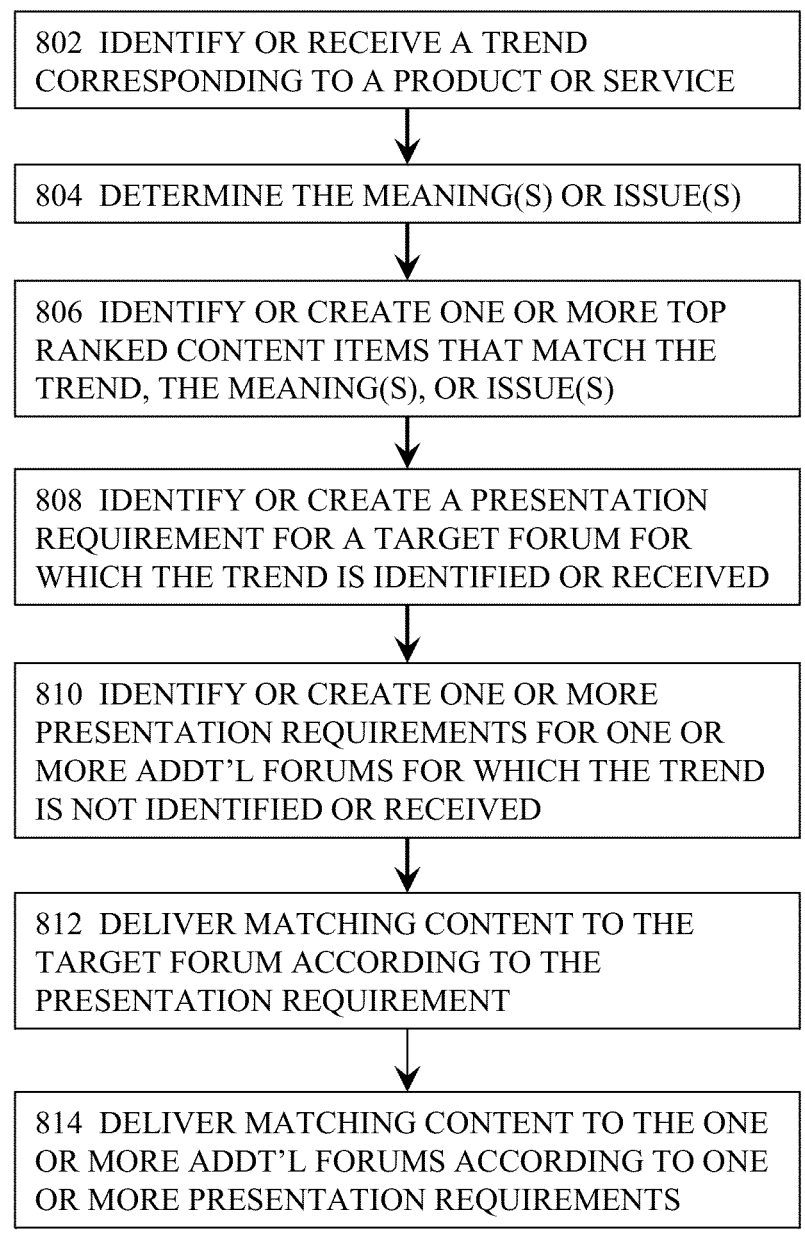
FIG. 8 illustrates more details for a flow diagram for addressing popular topics in a social sphere in some embodiments.

FIG. 8 illustrates more details for a flow diagram for addressing popular topics in a social sphere in some embodiments. In some embodiments, the method or the system for addressing popular topics in a social sphere may comprise the respective process or module 802 to identify or receive a trend that corresponds to product or service. In some embodiments, the method or the system for addressing popular topics may comprise the respective process or module 804 to determining the meaning(s) or issue(s) of the trend by using, for example but not limited to, techniques such as parsing, natural language processing, data mining, knowledge extraction, information extraction, data dredging, profiling, fuzzy string search or matching, or knowledge discovery, etc. In some embodiments, the method or the system for addressing popular topics may comprise the respective process or module 806 to identify or create one or more top ranked content items that match the identified or received trend, the determined meaning(s), or the determined issue(s). In some embodiments, the content items that match a trend, a meaning of the trend, or an issue of the trend may be ranked based at least in part on a keyword matching result. For example, if a trend is determined to include a first number of keywords of a keyword database, and the first content item and the second content item are respectively determined to include a second number and a third number of these keywords in the keyword database, the first content item may be ranked higher than the second content item if the first number is greater than the second number. A first content item may also be ranked higher than a second content item with respect to a trend, a meaning of the trend, or an issue of the trend of the first content item is determined to include more matching relationships or patterns among the terms than the second content item. In some embodiments, the method or the system may further associate a matching score with a content item with respect to a trend, a meaning of the trend, or an issue of the trend. The matching score may be determined by, for example, the number of keywords found, the occurrence of a keyword, the relationship(s) among a plurality of keywords or among a keyword and other terms, a pattern in which certain terms appear, etc. The matching score may comprise an absolute numeric value, a symbol, a relative numeric value, a percentage, or a word. In some embodiments, the method or the system for addressing popular topics may comprise the respective process or module 808 to identify or create a presentation requirement for a target forum for which the trend is identified or received. In some embodiments, the method or the system for addressing popular topics may comprise the respective process or module 810 to identify or create one or more presentation requirements for one or more additional forums for which the trend is not identified or received. In some embodiments, the method or the system for addressing popular topics may comprise the respective process or module 812 to deliver at least some of the one or more top ranked content items to the target forum according to the presentation requirement for the target forum. In some embodiments, the method or the system for addressing popular topics may optionally comprise the respective process or module 814 to deliver at least some of the one or more top ranked content items to the one or more additional forums according to their respective presentation requirement(s). In some embodiments, only one or the top few matching content items are delivered to the forum, but the remaining matching content items may also be made available upon request by a user. For example, the method or the system may embed or provide a link or inquiry which, when activated by a user (e.g., clicking on the link or responding to the inquiry), may bring up additional matching content items. In some embodiments, the method or the system may provide some inquiries in the presentation and await user's input and then use the user's input to further fine tune the matching process so as to produce more accurate matching content item(s). In some embodiments, the method or the system may provide some inquiries to one or more users before the method or system identifies the matching contenting items and uses the user's response or feedback to tune the matching process as an additional criterion or an additional rule so as to produce more accurate matching results.

Figure 9:
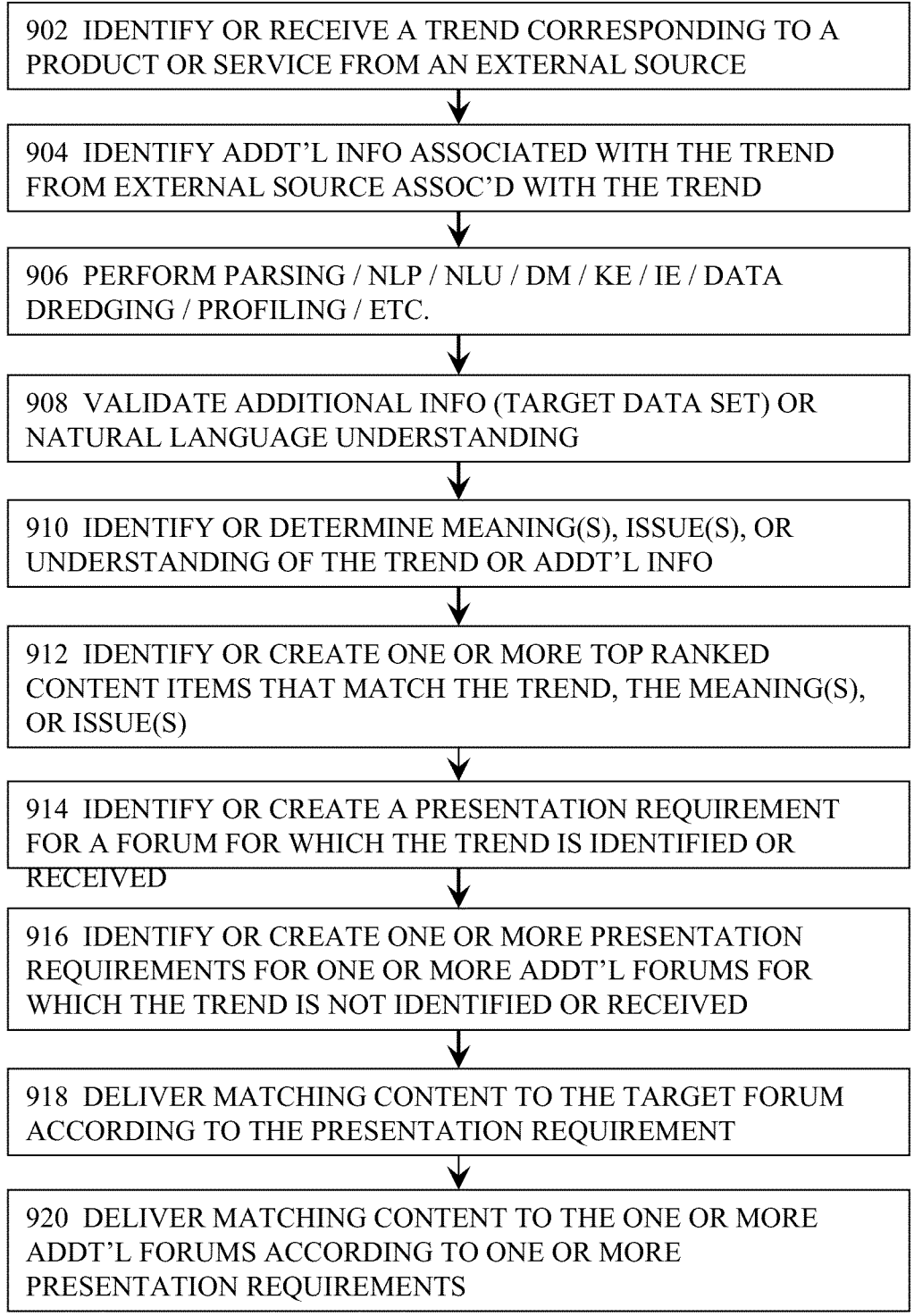
FIG. 9 illustrates more details for a flow diagram for addressing popular topics in a social sphere in some embodiments.

FIG. 9 illustrates more details for a flow diagram for addressing popular topics in a social sphere in some embodiments. In some embodiments, the method or the system for addressing popular topics may comprise the respective process or module 902 to identify or receive a trend corresponding to a product or service from an external source such as a third-party trending product or service. In some embodiments, the method or the system for addressing popular topics may comprise the respective process or module 904 to identify additional information associated with the trend from external source(s) associated with the trend. For example, the process or module 904 may invoke one or more Internet bots to crawl the webpages showing the trend or to execute one or more programs that imitate a human being's browsing actions to browse through the embedded links or URLs on the webpages showing the trend to acquire additional information about the trend. In some embodiments, the method or the system for addressing popular topics may comprise the respective process or module 906 to understand the trend or the additional information by performing various techniques such as parsing, natural language processing, data mining, knowledge extraction, information extraction, data dredging, profiling, etc. In some embodiments, the method or the system for addressing popular topics may comprise the respective process or module 908 to validate the additional information in a similar manner as that described with reference to the process or module 506. In some embodiments, the method or the system for addressing popular topics may comprise the respective process or module 910 to identify or determine meaning(s), issue(s), or understanding of the trend and/or the additional information. In some embodiments, the method or the system for addressing popular topics may comprise the respective process or module 912 to identify or create one or more top ranked content items that match the trend, the meaning(s), or the issue(s). In some embodiments, the method or the system for addressing popular topics may comprise the respective process or module 914 to identify or create a presentation requirement for a target forum for or from which the trend is identified or received. In some embodiments, the method or the system for addressing popular topics may optionally comprise the respective process or module 916 to identify or create one or more additional presentation requirements for one or more additional forums for or from which the trend is not identified or received. In some embodiments, the method or the system for addressing popular topics may comprise the respective process or module 918 to deliver at least some of the one or more top ranked content items that match the trend, the meaning(s), or the issue(s) to the target forum based at least in part upon the presentation requirement associated with the target forum. In some embodiments, the method or the system for addressing popular topics may optionally comprise the respective process or module 906 to deliver at least some of the one or more top ranked content items that match the trend, the meaning(s), or the issue(s) to the one or more additional forums based at least in part upon the respective presentation requirement(s) for each of the one or more additional forums. In some embodiments, only one or the top few matching content items are delivered to the forum, but the remaining matching content items may also be made available upon request by a user. For example, the method or the system may embed or provide a link or inquiry which, when activated by a user (e.g., clicking on the link or responding to the inquiry), may bring up additional matching content items. In some embodiments, the method or the system may provide some inquiries in the presentation and await user's input and then use the user's input to further fine tune the matching process so as to produce more accurate matching content item(s). In some embodiments, the method or the system may provide some inquiries to one or more users before the method or system identifies the matching contenting items and uses the user's response or feedback to tune the matching process as an additional criterion or an additional rule so as to produce more accurate matching results.

Figure 10:
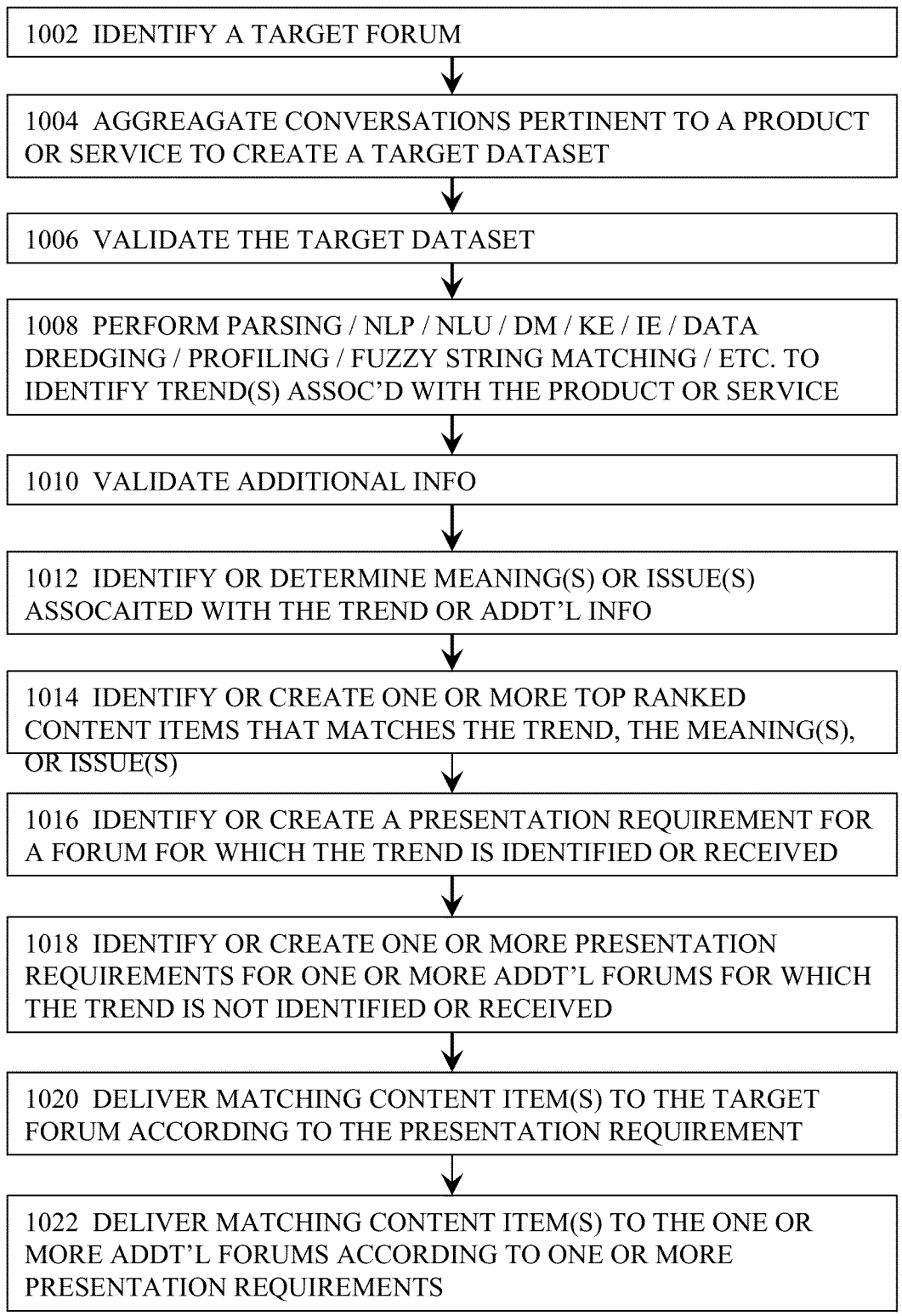
FIG. 10 illustrates more details for a flow diagram for addressing popular topics in a social sphere in some embodiments.

FIG. 10 illustrates more details for a flow diagram for addressing popular topics in a social sphere in some embodiments. In some embodiments, the method or the system for addressing popular topics may comprise the respective process or module 1002 to identify a target forum. In some embodiments, the method or the system may comprise the respective process or module 1004 to aggregate conversations that are related to a product or service to create a target dataset in a similar manner as that described for the process or module 506 in FIG. 5. In some embodiments, the method or the system may comprise the respective process or module 1006 to validate the correctness or validity the target dataset in a similar manner as that described for the process or module 506 in FIG. 5. In some embodiments, the method or the system may comprise the respective process or module 1008 to identify one or more trends associated with the product or service by performing, for example but not limited to, parsing, natural language processing, data mining, knowledge extraction, information extraction, data dredging, profiling, fuzzy string search or matching, or knowledge discovery, etc. In some embodiments, the method or the system may comprise the respective process or module 1010 to validate the correctness or validity of the additional information. In some embodiments, the method or the system may comprise the respective process or module 1012 to identify or determine the meaning(s) or issues(s) associated with the trend or the additional information. In some embodiments, the method or the system may comprise the respective process or module 1014 to identify or create one or more top ranked content items that match the trend, the meaning(s), or the issue(s). In some embodiments, the method or the system may comprise the respective process or module 1016 to identify or create a presentation requirement for the target forum for or from which the trend is identified or received. In some embodiments, the method or the system may comprise the respective process or module 1018 to identify or create one or more additional presentation requirements for one or more additional forums for or from which the trend is not identified or received. In some embodiments, the method or the system may comprise the respective process or module 1020 to deliver at least some of the one or more top ranked content items to the target forum based at least in part upon the presentation requirement for the target forum. In some embodiments, the method or the system may optionally comprise the respective process or module 1022 to deliver at least some of the one or more top ranked content items to the one or more additional forums based at least in part upon the respective one or more presentation requirements for each of the one or more additional forums. In some embodiments, only one or the top few matching content items are delivered to the forum, but the remaining matching content items may also be made available upon request by a user. For example, the method or the system may embed or provide a link or inquiry which, when activated by a user (e.g., clicking on the link or responding to the inquiry), may bring up additional matching content items. In some embodiments, the method or the system may provide some inquiries in the presentation and await user's input and then use the user's input to further fine tune the matching process so as to produce more accurate matching content item(s). In some embodiments, the method or the system may provide some inquiries to one or more users before the method or system identifies the matching contenting items and uses the user's response or feedback to tune the matching process as an additional criterion or an additional rule so as to produce more accurate matching results.

Figure 11:
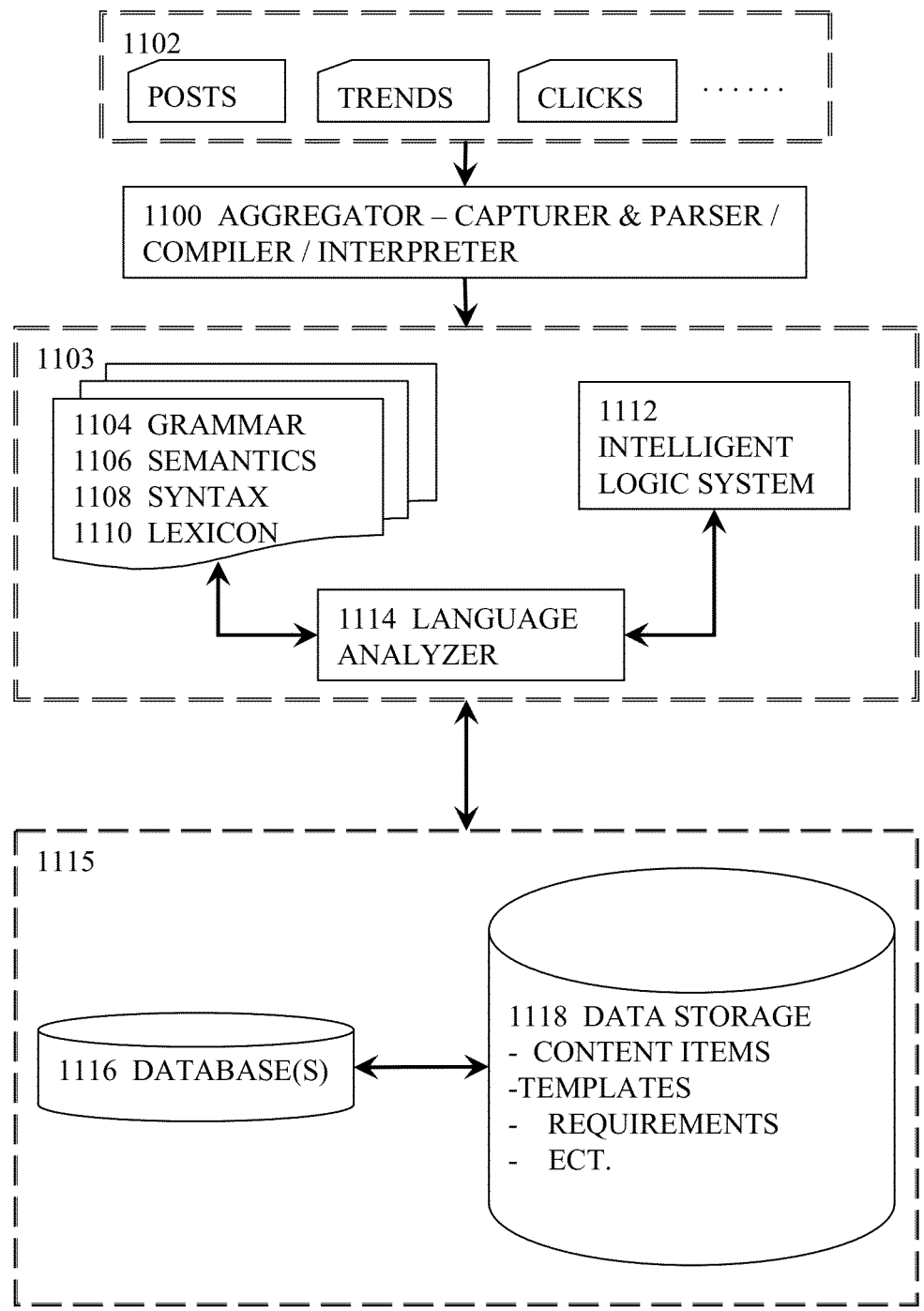
FIG. 11 illustrates more details for a part of the aggregator component and in some embodiments.

FIG. 11 illustrates more details for a part of the process illustrated in FIG. 2 in some embodiments. More specifically, FIG. 11 illustrates some exemplary processes for performing or modules to perform the action 202 of identifying a pertinent trend. In one or more embodiments, the process or module 202 comprises a parser, compiler, or interpreter (hereinafter parser) 1100 and a capturer 1100, which receives or identifies various conversations 1102 (e.g., one or more posts, trends, online conversations, clicks, searched items, etc.) that have been identified or received in, for example the one or more application servers 128 or 120 of FIG. 1. The parser 1100 interacts with, reads from, or writes to a backend analyzer 1103 and a storage module 1115 in some embodiments.

The backend analyzer 1103 comprises the grammar module 1104, semantics module 1106, the syntax module 1108, and/or the lexicon module 1110 in some embodiments. The backend analyzer 1103 may further comprise the language analyzer 1114 that interacts with the grammar module 1104, the semantics module 1106, the syntax module 1108, and/or the lexicon module 1110 to analyze the content of the identified or received conversations 1102.

In one or more embodiments, the backend analyzer 1103 may parse through the various conversations 1102 to retrieve information. The grammar module 1104 may comprise grammar such as, but not limited to, dependency grammar, lexical functional grammar, categorical grammar, link grammar for natural language or human language processing, etc., to the parser 1100 for the parser 1100 to parse through and to help understand the contents of a particular conversation 1102.

The semantics module 1106 provides semantic information or meanings of vocabularies or expressions to help the parser 1100 to describe the contents of the conversations 1102 in a meaningful manner in the single embodiment or in some embodiments. The semantic module 1106 may comprise the generative or interpretative semantics to help explain, for example but not limited to, synonymy or transformation of the vocabularies or expressions of the identified or received conversations 1102 in some embodiments.

The syntax module 1108 provides the parser 1100 with one or more principles, rules, or syntaxes to help the parser 700 to describe the contents of a particular conversation 1102 in the single embodiment or in some embodiments. The syntax module 1108 may also interact with the grammar module 1104 to describe the contents of the conversation 1102 according to the one or more rules or principles.

The lexicon module 1110 with vocabulary support in some embodiments. The vocabulary support comprises a set of lexemes to support the parser 1100. For example, the lexicon module 1110 provides a set of expressions and/or vocabularies and their respective linguistic morphology to support the parser 1100 such that the parser may understand the contents of the identified or received conversations.

One or more of the grammar module 1104, the semantics module 1105, the syntax module 1108, and the lexicon module 1110 may interact with the language analyzer 1114 to perform the grammatical analysis, the semantic analysis, the syntactical analysis, or the lexical analysis to help understand or describe the conversations 1102 in the single embodiment or in some embodiments. The language analyzer 1114 may further interact with an intelligent logic system 1112 to further better help understand or describe the conversations 1102 in some embodiments.

The intelligent logic system 1112 may comprise, for example but not limited to, artificial intelligence module, an expert system, a knowledge engineering module, a fuzzy logic module, a supervised or unsupervised learning module or any other types of module with intelligence to improve the accuracy of the understanding or description of the conversations 1102. For example, the intelligent logic system 1112 may provide additional capabilities to the language analyzer 1114 to resolve ambiguities by using or implementing expert assessment of the conversations 1102 and may further invoke, for example, a decision logic of an artificial intelligence module to determine whether the accuracy of the understanding or description of the conversations may be improved.

In some embodiments, the method or system adopts a neural network for the purpose of artificial intelligence. In some embodiments, the neural network refers to the artificial neural network or a simulated neural network which is composed of structurally or functionally interconnecting artificial nodes or programming constructs using a mathematical and/or a computational model for information processing by mimicking one or more properties of biological neurons based upon a connectionistic approach to computation without actually constructing the actual model of the system under investigation. Note that various terms such as neurons, neurodes, processing elements, or units may be used interchangeably with the term "structurally or functionally interconnecting artificial nodes" or "programming constructs". In various embodiments, the artificial neural network comprises an adaptive system which changes its structure based upon external and/or internal information that goes through the artificial neural network.

Artificial intelligence training on the artificial intelligence system or the artificial neural network may be performed to find, fine tune, adjust, or modify one or more relationships or correlations between, for example, the available information or data and the language analyzer 1114 or between the determined understanding or description and the contents of the conversations 1102. Once the training of the artificial intelligence process or module is complete, the method or the system may then utilize the artificial intelligence module for the understanding, description, or analysis of the identified or received conversations.

One example of a suitable storage module 1115 comprises one or more databases 1116 and a data storage portion 1118, which may persistently store thereupon, for example but not limited to, content items, user information, data, or statistics, information, data, or statistics of a plurality of orders, classification or categorization of a plurality of conversations, various presentation templates or requirements, various static or dynamic libraries, dictionaries, or data structures for various processes or modules described herein, etc.

The system may also comprise or interact with one or more forms of temporary storage such as some random access memory to temporarily store various data, variable or parameter values, objects, or other information required or need for the execution of various processes or modules described herein or processes or modules required or needed to support the execution of various processes or modules described herein. The one or more databases 1116 and the data storage 1118 may be implemented in separate storage units such as any volatile or non-volatile computer readable, non-transitory storage media. In some embodiments, the one or more databases 1116 and the data storage 1118 may be implemented in a single storage unit.

Figure 12:
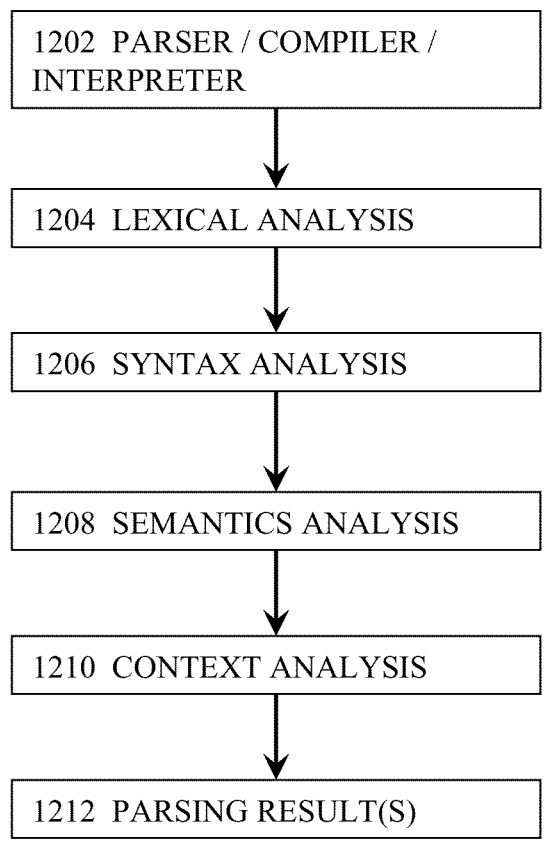
FIG. 12 illustrates more details for the parser component of the aggregator component in some embodiments.

FIG. 12 illustrates more details for a part of the process illustrated in FIG. 2 in some embodiments. More specifically, FIG. 12 illustrates more details of the parser 1202 which may comprise the lexicon analysis process or module 1204, which performs a lexing or scanning process to break up the contents of the conversations identified or received at, for example, the one or more application servers 120 or 128 in FIG. 1, into small tokens or units of the language. The units of language may be, for example, keywords, identifiers, or symbols such that the contents of the conversations may be recognized. The parser 1202 may further comprise the syntax analysis process or module 1206 which processes the results of the lexicon analysis process or module 1204 to identify the syntactic structure of the conversations so as to build a parsing result such as, but not limited to, a parse tree which represents the syntactic structure according to some grammar(s).

The parser 1202 may further comprise the semantics analysis module or process 1208 by using, for example, the language analyzer process or module 1114 based at least in part on the information from one or more processes or modules 1104-1110 to add semantic information to the result(s) of the syntactic analysis module or process 1206 in some embodiments. The semantic analysis process or module 1208 may further comprise the process or module for performing static or dynamic semantic checks for type errors.

The parser process or module 1202 may also comprise the context analysis process or module 1210 to analyze the context in which certain tokens or units are used so as to further ascertain or correct the results of various results of the lexicon analysis process or module 1204, the syntax analysis process or module 1206, the semantics analysis process or module 1208. For example, the context analysis process or module 1201 may determine the meaning of a particular word or a particular symbol based on the preceding and/or the subsequent words, symbols, or expressions. For example, the exclamation mark ! has different meaning depending on the context in which the exclamation mark is used. In a literal construction, the exclamation mark may indicate a sharp or sudden utterance expressive of strong feeling of the user. On the other hand, the exclamation mark in a relational operator means "not equal to" when the exclamation mark is followed by "=".

At 1212, the parser 1202 may comprise the process or module of building the parsing result(s) in the single embodiment or in some embodiments. The parsing result may comprise, for example but not limited to, a parse tree or a linguistic parse tree which may be further used for additional processing.

Figure 13:
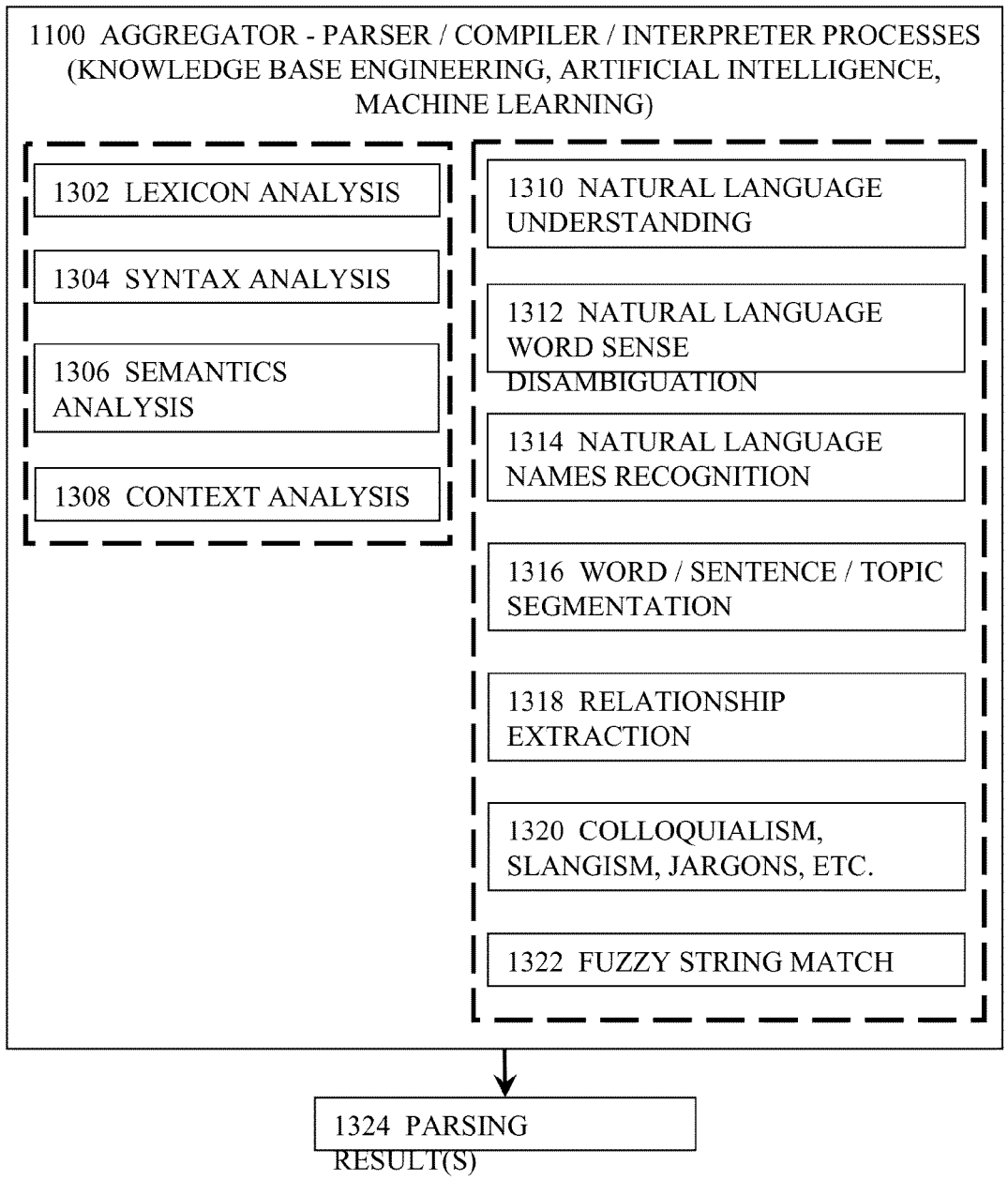
FIG. 13 illustrates more details for the parser component of the aggregator component in some embodiments.
Figure 14:
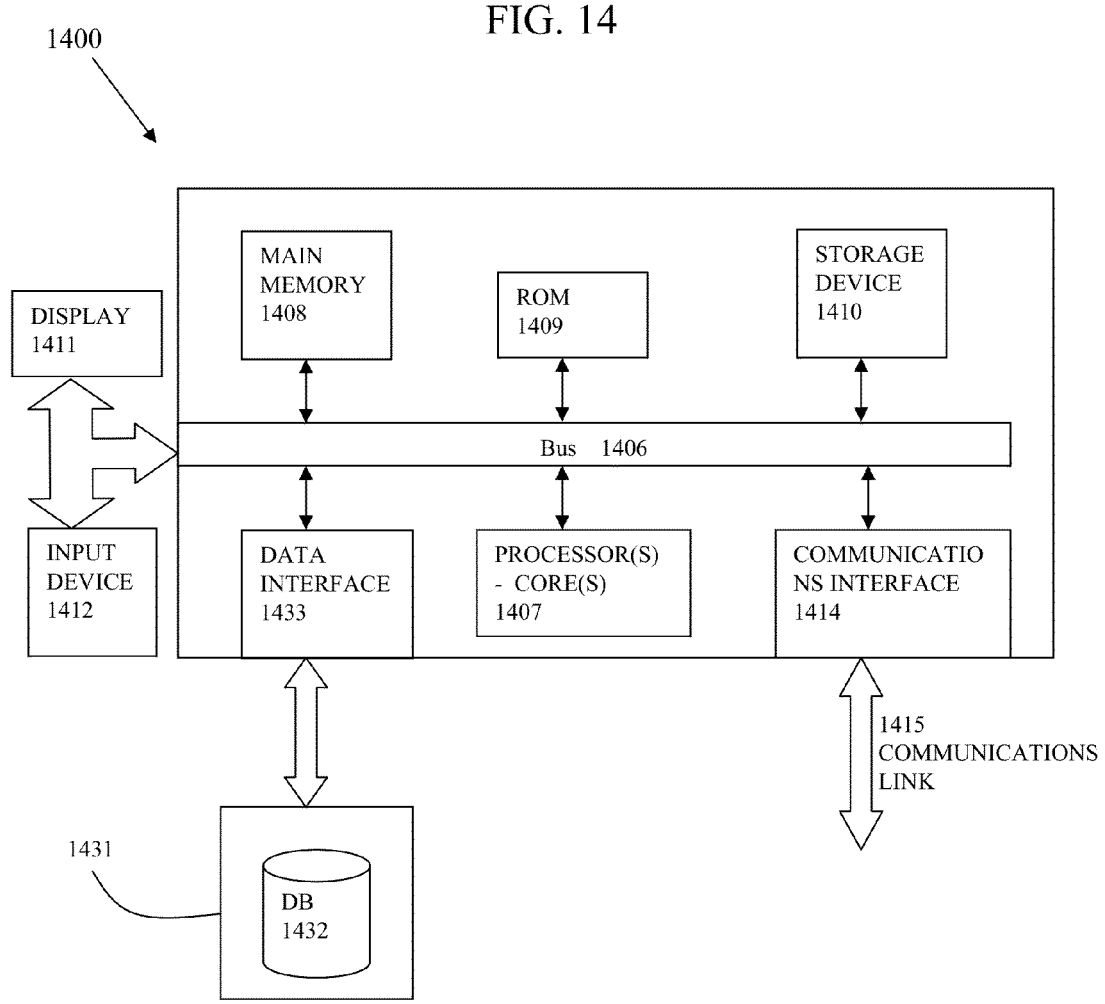
FIG. 14 illustrates a block diagram of an illustrative computing system 1400 suitable for implementing various embodiment of the invention.

FIG. 13 illustrates more details for a part of the process illustrated in FIG. 2 in some embodiments. More specifically, FIG. 13 illustrates more details about the parser 1100 in some embodiments. As described with reference to FIG. 12, the parser process or module 1100 may comprise the respective lexicon analysis process or module 1302, the respective syntax analysis process or module 1304, the respective semantics analysis process or module 1306, or the respective context analysis process or module 1308 in some embodiments. In some embodiments, the parser process or module 700 may comprise the respective process for performing or module to perform natural language processing.

In some embodiments, the process or module for natural language processing comprises a respective artificial intelligence process or module to perform natural language understanding 1310 that enables a computing system, such as the one or more application servers 120 or 128 of FIG. 1, to comprehend the conversations by determining the language used in the conversations, the lexicon of the language, and grammar rules for the conversations, and further by applying appropriate syntactic, semantic schemes, or logical inference to the conversations. In some embodiments, the process or module for natural language processing comprises a respective artificial intelligence process or module 1312 to perform natural language word sense disambiguation to select the appropriate meaning that makes the most sense for a word that has more than one meaning.

In some embodiments, the natural language word sense disambiguation may also cooperate with the relation extraction (1318) and a data dictionary or other electronic sources to determine the appropriate meaning for such a word. In some embodiments, the process or module for natural language processing comprises a respective artificial intelligence process or module 1314 to perform natural language names recognition to determine whether a string of text or symbols in a conversation may be mapped to a proper name, such as the name of a company, an item, etc. In some embodiments, the process or module for natural language processing comprises a respective artificial intelligence process or module 1316 to perform word, sentence, or topic segmentation to separate a set of text into segments of words, sentences, or topics by using techniques such as morphology.

In some embodiments, the process or module for natural language processing comprises a respective artificial intelligence process or module 1318 to perform relationship extraction to identify one or more fine-grained or coarse-grained relationships from a string of text or objects in a conversation by detecting and classifying the semantic relationship mentions with domain ontologies or other electronic sources. In some embodiments, the process or module may output the results of relationship extraction in the RDF (Resource Description Framework) format.

In some embodiments, the process or module for natural language processing comprises a respective artificial intelligence process or module 1320 to consult one or more data structures, one or more databases, one or more dictionaries, or any combinations thereof to determine the meaning of certain terms used in a conversation to accommodate colloquialisms, slangisms, or jargons. In some embodiments, a colloquialism comprises a phrase or a lexical item that is common in conversations, rather than a formal speech, academic writing, or paralinguistics. A jargon may comprise a terminology that is defined in relationship to a specific activity, group, or profession, or geographical area and may be used to express ideas that are frequently used among members of the specific activity, group, or profession, or geographical area. A slang comprises In some embodiments, the process or module for natural language processing comprises a respective artificial intelligence process or module 1322 to perform fuzzy string or approximate string search or match to find one or more strings in a conversation that approximately, rather than exactly, match a pattern that has already been recognized by the computing system, such as the one or more application servers 120 or 128 of FIG. 1, by using techniques such as, but not limited to dynamic programming or the Levenshtein distance computing algorithm to find the smallest distance between each of the one or more strings and a recognized pattern. The parser 1100 may then generate the parsing result(s) at 1324.

System Architecture Overview

FIG. 13 illustrates a block diagram of an illustrative computing system 1400 suitable for implementing various embodiment of the invention. For example, the exemplary computing system 1400 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processors or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1407 may be used to perform various actions such as various actions, processes, or modules involving determining, analyzing, performing actions, etc. In some embodiments, at least one of the one or more processors or processor cores 1407 has the multithreading capability.

In one embodiment, the term "logic" shall mean any combination of software or hardware that is used to implement all or part of the invention. In the single embodiment or in some embodiments, the one or more processors or processor cores 1407 may be used to perform various acts such as various acts involving determining, analyzing, performing actions, etc. In some embodiments, at least one of the one or more processors or processor cores 1407 has the multithreading capability to execute a plurality of threads to perform various tasks as described in the preceding sections.

Various actions as described in the preceding paragraphs may be performed by using one or more processors, one or more processor cores, or combination thereof 1407. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
a computer identifying a pertinent trend in conversations of a target forum;
the computer identifying or creating one or more content items that match the pertinent trend and a presentation requirement for the one or more content items by:
performing a content management process on a plurality of existing content items;
classifying or clustering at least some of the plurality of existing content items to identify one or more classifications for an existing content item of the plurality of existing content items;
identifying or determining one or more relationships between the existing content item and a product or service; and
matching the pertinent trend with one or more existing content items of the plurality of existing content items; and
the computer delivering at least some of the one or more content items to the target forum based at least in part upon the presentation requirement.

2. The computer implemented method of claim 1, identifying the pertinent trend in the conversations of the target forum comprising:
identifying or receiving one or more trends from an external source;
determining the pertinent trend from the one or more trends by at least performing a trend filtering process; and
determining a meaning of or an issue associated with the pertinent trend by performing a process.

3. The computer implemented method of claim 2, determining the meaning of or the issue associated with the pertinent trend comprising:
   performing a lexical analysis on the pertinent trend to convert at least a part of the pertinent trend into a sequence of tokens;
   performing a syntax analysis on the at least the part of the pertinent trend to analyze the sequence of tokens to determine a syntactic structure of the at least the part of the pertinent trend with respect to a grammar;
   performing a semantics analysis on the at least the part of the pertinent trend to associate semantic information with the at least the part of the pertinent trend; and
   performing a context analysis on the at least the part of the pertinent trend to determine one or more specific contexts with which the at least the part of the pertinent trend is associated.

4. The computer implemented method of claim 2, determining the meaning of or the issue associated with the pertinent trend comprising performing a natural language processing on the pertinent trend.

5. The computer implemented method of claim 4, performing the natural language processing on the pertinent trend comprising:
   performing a natural language understanding process on the pertinent trend to convert at least a part of the pertinent trend into one or more representation structures to be manipulated by a computing system;
   performing a natural language word sense process on the pertinent trend to determine one meaning from a plurality of meanings of a term associated with the at least the part of the pertinent trend;
   recognizing one or more recognized terms in the at least the part of the pertinent trend;
   performing word, sentence, or topic segmentation on the at least the part of the pertinent trend; and
   identifying or determining one or more relationships between a first portion and a second portion of the at least the part of the pertinent trend.

6. The computer implemented method of claim 1, identifying the pertinent trend in the conversations of the target forum comprising:
   identifying or receiving one or more trends from an external source;
   aggregating additional information or data that are associated with the one or more trends; and
   determining a meaning or an issue based at least in part upon the additional information or data.

7. The computer implemented method of claim 6, identifying the pertinent trend in the conversations of the target forum comprising:
   filtering the one or more trends to determine the pertinent trend; and
   filtering the additional information or data associated with the one or more trends to determine pertinent information or data associated with the pertinent trend.

8. The computer implemented method of claim 7, identifying the pertinent trend in the conversations of the target forum comprising determining the meaning or the issue based at least in part upon the pertinent trend or the pertinent information or data associated with the pertinent trend.

9. The computer implemented method of claim 7, filtering the one or more trends comprising performing a data dredging process on the one or more trends; and filtering the one or more trends comprising performing the data dredging process on the additional information or data associated with the one or more trends.

10. The computer implemented method of claim 1, identifying the pertinent trend in the conversations of the target forum comprising:
    monitoring at least a part of the conversations in a social sphere;
    aggregating the at least the part of the conversations to create a target data set;
    performing a natural language processing on the target data set; and
    identifying the pertinent trend based at least in part upon a result of the natural language processing.

11. The computer implemented method of claim 10, identifying the pertinent trend in the conversations of the target forum comprising:
    validating the target data set by using one or more test cases;
    adjusting the conversations that have been aggregated based at least in part upon a result of validating the target data set; and
    determining a meaning of or an issue associated with the pertinent trend.

12. The computer implemented method of claim 10, monitoring the at least the part of the conversations in the social sphere comprising using a program that browses at least a part of the target forum in an automated manner and is designed with reference to a robots exclusion standard associated with the target forum.

13. The computer implemented method of claim 1, the content management process comprising at least one of:
    capturing one or more content items to form the plurality of existing content items;
    recognizing one or more objects of interest of the plurality of existing content items;
    processing the plurality of existing content items to clean up at least some of the plurality of content items;
    unifying related data or information that is related to the plurality of existing content items by at least aggregating the related data or information from one or more sources of data or information;
    indexing the plurality of existing content items by associating one or more indices with the plurality of existing content items; and
    transforming the plurality of existing content items from a first format to a second format.

14. The computer implemented method of claim 13, indexing the plurality of existing content items comprising:
    analyzing a format of and a language used in the plurality of existing content items;
    performing natural language processing on the plurality of existing content items;
    parsing the plurality of existing content items to determine a parsing result for the plurality of existing content items; and
    performing an action of indexing the plurality of existing content items based at least in part upon the result of parsing the plurality of existing content items.

15. The computer implemented method of claim 1, further comprising parsing at least some of the one or more content items, parsing comprising:
    providing vocabulary support by using a set of lexemes;
    describing at least a part of the plurality of existing content items by using one or more syntaxes, one or more principles, or one or more rules determined from a syntax analysis;

determining or identifying semantic information or meanings for the at least the part of the plurality of existing content items by using generative or interpretative semantics; and determining or identifying an understanding of the at least the part of the plurality of existing content items by using one or more grammars.

16. The computer implemented method of claim 15, parsing further comprising performing natural language processing on the at least some of the one or more content items.

17. The computer implemented method of claim 16, performing the natural language processing comprising:
performing natural language understanding or machine reading comprehension;
resolving polysemy in the at least some of the one or more content items;
identifying a mapping between a term in the at least some of the one or more content items and a corresponding term that is understood by a computing system;
performing segmentation on one or more words, one or more sentences, or one or more topics; and
creating a model for one or more semantic relationships that are determined or detected within the at least some of the one or more content items by using domain ontologies.

18. The computer implemented method of claim 1, further comprising:
receiving additional information or data that are related to the at least some of the one or more content items from a separate computing system or a separate site; and
delivering the at least some of the one or more content items to the separate computing system or the separate site.

19. The computer implemented method of claim 18, receiving the additional information or data comprising classifying an order in the aggregated representation among a plurality of orders by using the addition information or data received from a remote computing system, in which the additional information or data or the data on the remote computing system is at least one type of data selected from the group consisting of: personal finance data, tax data, budgeting data, order receipt data, accounting data, and tax return data.

20. An article of manufacture comprising a non-transitory computer readable storage medium having stored thereupon a sequence of instructions which, when executed by a computer, causes the computer to perform a computer-implemented method comprising:
identifying a pertinent trend in conversations of a target forum;
identifying or creating one or more content items that match the pertinent trend by:
performing a content management process on a plurality of existing content items,
classifying or clustering at least some of the plurality of existing content items to identify one or more classifications for an existing content item of the plurality of existing content items,
identifying or determining one or more relationships between the existing content item and a product or service, and matching the pertinent trend with one or more existing content items of the plurality of existing content items, and
identifying or creating a presentation requirement for the one or more content items; and
delivering at least some of the one or more content items to the target forum based at least in part upon the presentation requirement.

21. The article of manufacture of claim 20, identifying the pertinent trend in the conversations of the target forum comprising:
identifying or receiving one or more trends from an external source;
determining the pertinent trend from the one or more trends by at least performing a trend filtering process; and
determining a meaning of or an issue associated with the pertinent trend by:
performing a lexical analysis on the pertinent trend to convert at least a part of the pertinent trend into a sequence of tokens,
performing a syntax analysis on the at least the part of the pertinent trend to analyze the sequence of tokens to determine a syntactic structure of the at least the part of the pertinent trend with respect to a grammar,
performing a semantics analysis on the at least the part of the pertinent trend to associate semantic information with the at least the part of the pertinent trend, and
performing a context analysis on the at least the part of the pertinent trend to determine one or more specific contexts with which the at least the part of the pertinent trend is associated.

22. The article of manufacture of claim 21, determining the meaning of or the issue associated with the pertinent trend comprising:
performing a natural language processing on the pertinent trend, by performing at least a natural language understanding process on the pertinent trend to convert at least a part of the pertinent trend into one or more representation structures to be manipulated by a computing system;
performing a natural language word sense process on the pertinent trend to determine one meaning from a plurality of meanings of a term associated with the at least the part of the pertinent trend;
recognizing one or more recognized terms in the at least the part of the pertinent trend;
performing word, sentence, or topic segmentation on the at least the part of the pertinent trend; and
identifying or determining one or more relationships between a first portion and a second portion of the at least the part of the pertinent trend.

23. The article of manufacture of claim 20, identifying the pertinent trend in the conversations of the target forum comprising:
identifying or receiving one or more trends from an external source;
aggregating additional information or data that are associated with the one or more trends;
filtering the one or more trends to determine the pertinent trend;
filtering the additional information or data associated with the one or more trends to determine pertinent information or data associated with the pertinent trend; and
determining a meaning or an issue based at least in part upon the additional information or data or upon the pertinent trend or the pertinent information or data associated with the pertinent trend.

24. The article of manufacture of claim 20, identifying the pertinent trend in the conversations of the target forum comprising:
monitoring at least a part of the conversations in a social sphere;
aggregating the at least the part of the conversations to create a target data set;

performing a natural language processing on the target data set;

identifying the pertinent trend based at least in part upon a result of the natural language processing;

validating the target data set by using one or more test cases;

adjusting aggregating the conversations based at least in part upon a result of validating the target data set; and determining a meaning of or an issue associated with the pertinent trend.

25. A computing system, comprising: a computer comprising a processor for executing instructions and being configured to:

identify a pertinent trend in conversations of a target forum;

identify or create one or more content items that match the pertinent trend, the computer being configured to identify or create one or more content items by being configured to:

perform a content management process on a plurality of existing content items, classify or cluster at least some of the plurality of existing content items to identify one or more classifications for an existing content item of the plurality of existing content items, identify or determine one or more relationships between the existing content item and a product or service, and match the pertinent trend with one or more existing content items of the plurality of existing content items;

identify or create a presentation requirement for the one or more content items; and deliver at least some of the one or more content items to the target forum based at least in part upon the presentation requirement.

26. The system of claim 25, the computer being configured to identify the pertinent trend in the conversations of the target forum by being configured to:

identify or receive one or more trends from an external source;

determine the pertinent trend from the one or more trends by performing at least a trend filtering process; and determine a meaning of or an issue associated with the pertinent trend, wherein the computer is configured to determine the meaning by being configured to:

perform a lexical analysis on the pertinent trend to convert at least a part of the pertinent trend into a sequence of tokens, perform a syntax analysis on the pertinent trend to analyze the sequence of tokens to determine a syntactic structure of the at least a part of the pertinent trend with respect to a grammar, perform a semantics analysis on the pertinent trend to associate semantic information with the at least a part of the pertinent trend, and perform a context analysis on the pertinent trend to determine one or more specific contexts with which the pertinent trend is associated.

27. The system of claim 26, the computer being configured to determine the meaning of or the issue associated with the pertinent trend, the computer being configured to determine the meaning of or the issue by being configured to perform a natural language processing on the pertinent trend.

28. The system of claim 25, the computer being configured to identify the pertinent trend in the conversations of the target forum by the computer being configured to:

identify or receive one or more trends from an external source;

aggregate additional information or data that are associated with the one or more trends;

determine a meaning or an issue based at least in part upon the additional information or data;

filter the one or more trends to determine the pertinent trend;

filter the additional information or data associated with the one or more trends to determine pertinent information or data associated with the pertinent trend; and determine the meaning or the issue based at least in part upon the pertinent trend or the pertinent information or data associated with the pertinent trend.

29. The system of claim 25, the computer being configured to identify the pertinent trend in the conversations of the target forum by being configured to:

monitor at least a part of the conversations in a social sphere;

aggregate the at least the part of the conversations to create a target data set;

perform a natural language processing on the target data set;

identify the pertinent trend based at least in part upon a result of the natural language processing;

validate the target data set by using one or more test cases;

adjust the conversations that have been aggregated based at least in part upon a result of validating the target data set; and determine a meaning of or an issue associated with the pertinent trend.

30. A computer implemented method, comprising:

a computer identifying a pertinent trend in conversations of a target forum, identifying the pertinent trend comprising:

identifying or receiving one or more trends from an external source, determining the pertinent trend from the one or more trends by at least performing a trend filtering process, and determining a meaning of or an issue associated with the pertinent trend by performing a process, determining the meaning of or the issue comprising:

performing a lexical analysis on the pertinent trend to convert at least a part of the pertinent trend into a sequence of tokens, performing a syntax analysis on the at least the part of the pertinent trend to analyze the sequence of tokens to determine a syntactic structure of the at least the part of the pertinent trend with respect to a grammar, performing a semantics analysis on the at least the part of the pertinent trend to associate semantic information with the at least the part of the pertinent trend, and performing a context analysis on the at least the part of the pertinent trend to determine one or more specific contexts with which the at least the part of the pertinent trend is associated;

the computer identifying or creating one or more content items that match the pertinent trend and a presentation requirement for the one or more content items; and the computer delivering at least some of the one or more content items to the target forum based at least in part upon the presentation requirement.

31. The computer implemented method of claim 30, further comprising the computer performing at least one of:

identifying or receiving one or more trends from an external source;

aggregating additional information or data that are associated with the one or more trends; and
determining a meaning or an issue based at least in part upon the additional information or data.

32. A computer implemented method, comprising:
a computer identifying a pertinent trend in conversations of a target forum, identifying the pertinent trend comprising:
   identifying or receiving one or more trends from an external source,
   determining the pertinent trend from the one or more trends by at least performing a trend filtering process, and
   determining a meaning of or an issue associated with the pertinent trend by at least performing a natural language processing on the pertinent trend, performing the natural language processing comprising:
      performing a natural language understanding process on the pertinent trend to convert at least a part of the pertinent trend into one or more representation structures to be manipulated by a computing system,
      performing a natural language word sense process on the pertinent trend to determine one meaning from a plurality of meanings of a term associated with the at least the part of the pertinent trend,
      recognizing one or more recognized terms in the at least the part of the pertinent trend,
      performing word, sentence, or topic segmentation on the at least the part of the pertinent trend, and
      identifying or determining one or more relationships between a first portion and a second portion of the at least the part of the pertinent trend;
   the computer identifying or creating one or more content items that match the pertinent trend and a presentation requirement for the one or more content items; and
   the computer delivering at least some of the one or more content items to the target forum based at least in part upon the presentation requirement.

33. The computer implemented method of claim 32, further comprising the computer performing at least one of:
   identifying or receiving one or more trends from an external source;
   aggregating additional information or data that are associated with the one or more trends; and
   determining a meaning or an issue based at least in part upon the additional information or data.

34. A computer implemented method, comprising:
a computer identifying a pertinent trend in conversations of a target forum, identifying the pertinent trend comprising:
   monitoring at least a part of the conversations in a social sphere,
   aggregating the at least the part of the conversations to create a target data set,
   performing a natural language processing on the target data set,
   identifying the pertinent trend based at least in part upon a result of the natural language processing,
   validating the target data set by using one or more test cases,
   adjusting the conversations that have been aggregated based at least in part upon a result of validating the target data set, and
   determining a meaning of or an issue associated with the pertinent trend; and
   the computer identifying or creating one or more content items that match the pertinent trend and a presentation requirement for the one or more content items; and
   the computer delivering at least some of the one or more content items to the target forum based at least in part upon the presentation requirement.

35. The computer implemented method of claim 34, further comprising the computer performing at least one of:
   identifying or receiving one or more trends from an external source;
   aggregating additional information or data that are associated with the one or more trends; and
   determining a meaning or an issue based at least in part upon the additional information or data.

36. A computer implemented method, comprising:
a computer identifying a pertinent trend in conversations of a target forum, identifying the pertinent trend comprising:
   monitoring at least a part of the conversations in a social sphere by using a program that browses at least a part of the target forum in an automated manner and is designed with reference to a robots exclusion standard associated with the target forum,
   aggregating the at least the part of the conversations to create a target data set,
   performing a natural language processing on the target data set, and
   identifying the pertinent trend based at least in part upon a result of the natural language processing;
   the computer identifying or creating one or more content items that match the pertinent trend and a presentation requirement for the one or more content items; and
   the computer delivering at least some of the one or more content items to the target forum based at least in part upon the presentation requirement.

37. The computer implemented method of claim 36, further comprising the computer performing at least one of:
   identifying or receiving one or more trends from an external source;
   aggregating additional information or data that are associated with the one or more trends; and
   determining a meaning or an issue based at least in part upon the additional information or data.

38. A computer implemented method, comprising:
a computer identifying a pertinent trend in conversations of a target forum;
the computer identifying or creating one or more content items that match the pertinent trend and a presentation requirement for the one or more content items;
the computer parsing at least some of the one or more content items, parsing the at least some of the one or more content items comprising:
   providing vocabulary support by using a set of lexemes,
   describing at least a part of the plurality of existing content items by using one or more syntaxes, one or more principles, or one or more rules determined from a syntax analysis,
   determining or identifying semantic information or meanings for the at least the part of the plurality of existing content items by using generative or interpretative semantics, and
   determining or identifying an understanding of the at least the part of the plurality of existing content items by using one or more grammars; and
the computer delivering at least some of the one or more content items to the target forum based at least in part upon the presentation requirement.

39. The computer implemented method of claim 38, parsing the at least some of the one or more content items comprising performing natural language processing on the at least some of the one or more content items.

40. An article of manufacture comprising a non-transitory computer readable storage medium having stored thereupon a sequence of instructions which, when executed by a computer, causes the computer to perform a computer-implemented method comprising:
identifying a pertinent trend in conversations of a target forum by identifying or creating a presentation requirement for the one or more content items, and
delivering at least some of the one or more content items to the target forum based at least in part upon the presentation requirement, wherein identifying the pertinent trend in the conversations of the target forum comprises:
identifying or receiving one or more trends from an external source,
determining the pertinent trend from the one or more trends by at least performing a trend filtering process, and
determining a meaning of or an issue associated with the pertinent trend by performing a process, determining the meaning or the issue comprising:
performing a lexical analysis on the pertinent trend to convert at least a part of the pertinent trend into a sequence of tokens,
performing a syntax analysis on the at least the part of the pertinent trend to analyze the sequence of tokens to determine a syntactic structure of the at least the part of the pertinent trend with respect to a grammar,
performing a semantics analysis on the at least the part of the pertinent trend to associate semantic information with the at least the part of the pertinent trend, and
performing a context analysis on the at least the part of the pertinent trend to determine one or more specific contexts with which the at least the part of the pertinent trend is associated.

41. A computing system, comprising: a computer comprising a processor for executing instructions and being configured to:
identify a pertinent trend in conversations of a target forum by the computer being configured to:
identify or receive one or more trends from an external source,
determine the pertinent trend from the one or more trends by performing at least a trend filtering process,
determine a meaning of or an issue associated with the pertinent trend by performing a process comprising:
perform a lexical analysis on the pertinent trend to convert at least a part of the pertinent trend into a sequence of tokens,
perform a syntax analysis on the pertinent trend to analyze the sequence of tokens to determine a syntactic structure of the at least a part of the pertinent trend with respect to a grammar,
perform a semantics analysis on the pertinent trend to associate semantic information with the at least a part of the pertinent trend, and
perform a context analysis on the pertinent trend to determine one or more specific contexts with which the pertinent trend is associated;
identify or create one or more content items that match the pertinent trend; identify or create a presentation requirement for the one or more content items; and
deliver at least some of the one or more content items to the target forum based at least in part upon the presentation requirement.

42. A computing system, comprising: a computer comprising a processor for executing instructions and being configured to:
identify a pertinent trend in conversations of a target forum by the computer being configured or operable to
monitor at least a part of the conversations in a social sphere,
aggregate the at least the part of the conversations to create a target data set,
perform a natural language processing on the target data set,
identify the pertinent trend based at least in part upon a result of the natural language processing,
validate the target data set by using one or more test cases,
adjust the conversations that have been aggregated based at least in part upon a result of validating the target data set, and
determine a meaning of or an issue associated with the pertinent trend;
identify or create one or more content items that match the pertinent trend; identify or create a presentation requirement for the one or more content items; and
deliver at least some of the one or more content items to the target forum based at least in part upon the presentation requirement.

* * * * *